United States Patent
Ahdoot

(10) Patent No.: US 8,159,568 B2
(45) Date of Patent: Apr. 17, 2012

(54) HARDWARE IMPLEMENTED PIXEL LEVEL DIGITAL FILTER AND PROCESSING OF ELECTROMAGNETIC SIGNALS

(76) Inventor: Ned M. Ahdoot, Rancho Palos Verdes, CA (US)

( * ) Notice: Subject to any disclaimer, the term of this patent is extended or adjusted under 35 U.S.C. 154(b) by 25 days.

(21) Appl. No.: 12/657,986

(22) Filed: Feb. 1, 2010

(65) Prior Publication Data

US 2010/0245634 A1 Sep. 30, 2010

Related U.S. Application Data

(60) Provisional application No. 61/211,053, filed on Mar. 26, 2009.

(51) Int. Cl.
| | |
|---|---|
| H04N 5/217 | (2011.01) |
| H04N 7/18 | (2006.01) |
| H04N 7/00 | (2011.01) |
| G01D 18/00 | (2006.01) |
| G12B 13/00 | (2006.01) |
| G01J 5/02 | (2006.01) |
| G06K 9/40 | (2006.01) |

(52) U.S. Cl. ..... 348/241; 348/117; 348/147; 250/252.1; 250/341.5; 382/275

(58) Field of Classification Search ............... 348/241, 348/242, 253, 82, 117, 147, 342; 250/252.1, 250/341.5, 339.09, 363.09; 382/275

See application file for complete search history.

(56) References Cited

U.S. PATENT DOCUMENTS

| | | | | |
|---|---|---|---|---|
| 6,341,257 | B1 * | 1/2002 | Haaland | 702/27 |
| 6,415,233 | B1 * | 7/2002 | Haaland | 702/22 |
| 6,853,452 | B1 * | 2/2005 | Laufer | 356/436 |
| 7,049,597 | B2 * | 5/2006 | Bodkin | 250/353 |
| 7,120,294 | B2 * | 10/2006 | Hirayama | 382/162 |
| 7,132,648 | B2 * | 11/2006 | Ratiff et al. | 250/252.1 |
| 7,151,917 | B2 * | 12/2006 | Paulus | 455/302 |
| 7,304,297 | B1 * | 12/2007 | King et al. | 250/252.1 |
| 7,433,806 | B2 * | 10/2008 | Berk et al. | 703/2 |
| 7,529,404 | B2 * | 5/2009 | Ahdoot | 382/162 |
| 7,716,962 | B2 * | 5/2010 | Woodford et al. | 73/1.06 |
| 7,880,778 | B2 * | 2/2011 | Kamon | 348/241 |
| 2009/0272888 | A1 * | 11/2009 | Nugent et al. | 250/252.1 |
| 2009/0273675 | A1 * | 11/2009 | Jonsson | 348/164 |
| 2010/0051794 | A1 * | 3/2010 | Rogers | 250/252.1 |
| 2010/0246995 | A1 * | 9/2010 | Paulus et al. | 382/275 |

FOREIGN PATENT DOCUMENTS

| | | | |
|---|---|---|---|
| EP | 1953509 A1 * | 8/2008 | |
| JP | 2004304545 A * | 10/2004 | |
| JP | 2009074889 A * | 4/2009 | |

* cited by examiner

*Primary Examiner* — John Villecco

(57) ABSTRACT

An apparatus for performing digital video processing of electromagnetic waves in IR or other electromagnetic waves spectra; derived from adjacent or separate bands (or subbands) representing a channel of electromagnetic wave intensities; that is processed for equipment radiometric corrections (calibration), adverse environmental elements or substance calibrations, channel filtering in real time and dynamic pixel to pixel time.

12 Claims, 21 Drawing Sheets

FPA Temperature and Radiometric Correction, and Calibration

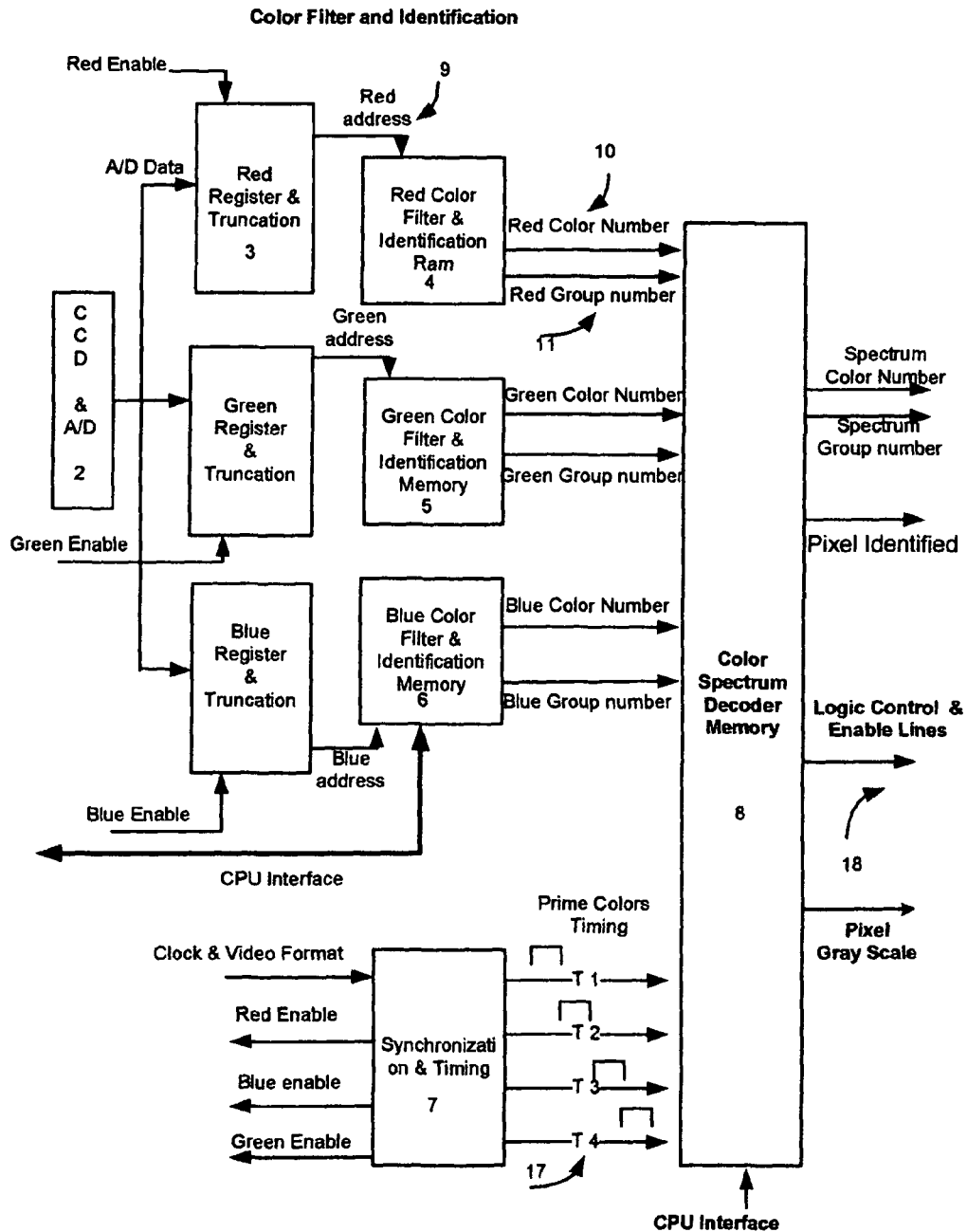
FIG 1A  Visible Light color Identification

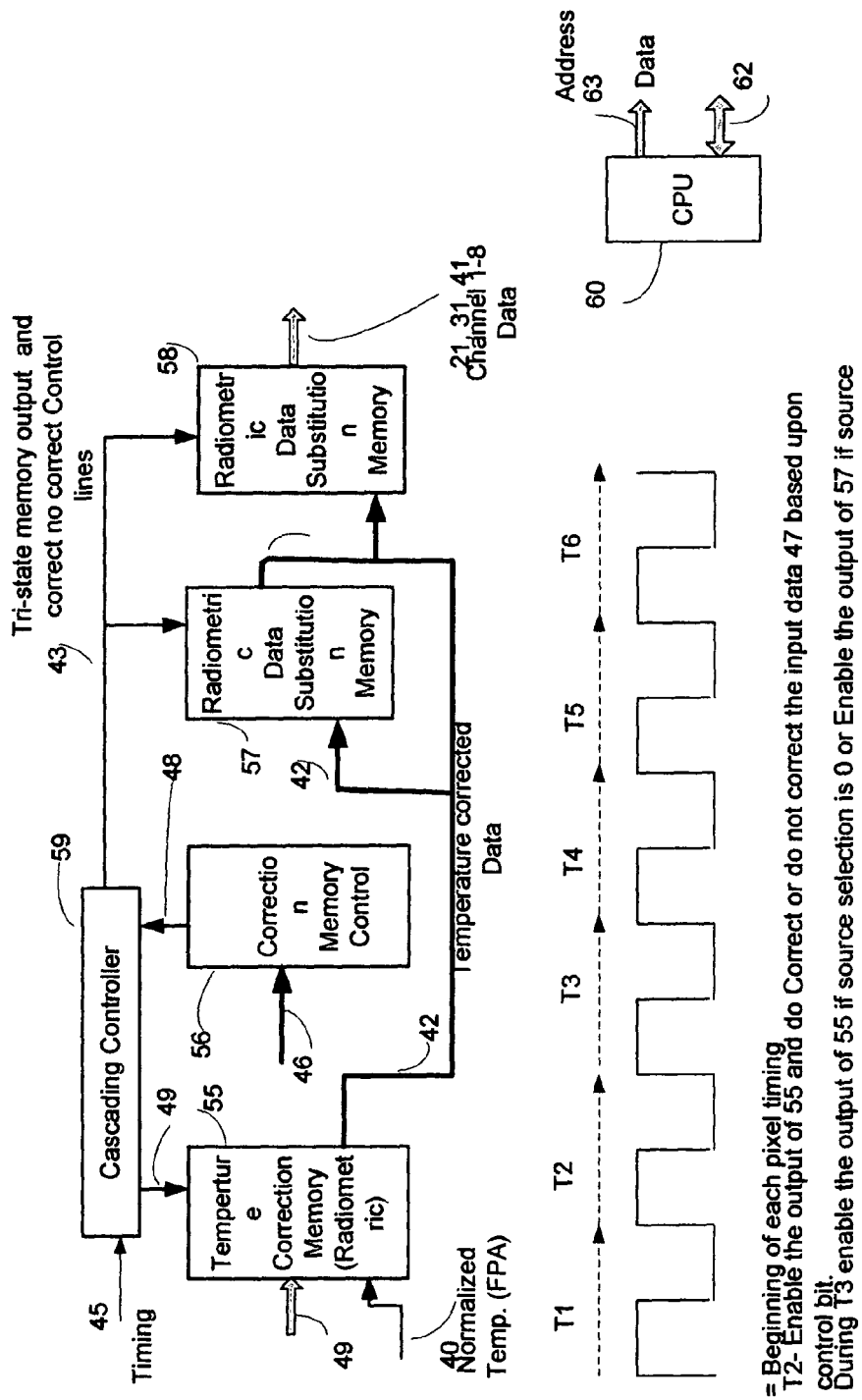
FIG 2- FPA Temperature and Radiometric Correction, and Calibration

| Temp. correction memory address | | | | | Temp. corrected Data In Memory |
|---|---|---|---|---|---|
| Normalized Temp. | | | | CCD Data | |
| 0 | 0 | 0 | 0 | xxxxxxxx | yyyyyyyy |
| 0 | 0 | 0 | 1 | xxxxxxxx | yyyyyyyy |
| 0 | 0 | 1 | 0 | xxxxxxxx | yyyyyyyy |
| 0 | 0 | 1 | 1 | xxxxxxxx | yyyyyyyy |
| 0 | 1 | 0 | 0 | xxxxxxxx | yyyyyyyy |
| 0 | 1 | 0 | 1 | xxxxxxxx | yyyyyyyy |
| 0 | 1 | 1 | 0 | xxxxxxxx | yyyyyyyy |
| 0 | 1 | 1 | 1 | xxxxxxxx | No Correction |
| 1 | 0 | 0 | 0 | xxxxxxxx | No Correction |
| 1 | 0 | 0 | 1 | xxxxxxxx | yyyyyyyy |
| 1 | 0 | 1 | 0 | xxxxxxxx | yyyyyyyy |
| 1 | 0 | 1 | 1 | xxxxxxxx | yyyyyyyy |
| 1 | 1 | 0 | 0 | xxxxxxxx | yyyyyyyy |
| 1 | 1 | 0 | 1 | xxxxxxxx | yyyyyyyy |
| 1 | 1 | 1 | 0 | xxxxxxxx | yyyyyyyy |
| 1 | 1 | 1 | 1 | xxxxxxxx | yyyyyyyy |

FIG. 2B - (FPA) Radiometric temperature Normalization and Correction

| Pixel Coordinate Address (46) | Pixel Addres requiring correction | Corretion Memoey Control Generator and Output memory Data Control | | | |
|---|---|---|---|---|---|
| | | Correction/No Correctionn (Data Bit) (57) | Correction/No Correctionn (Data Bit) (58) | Tristate Memory Control 55 and 57 | Correction Data ( output of 58) |
| Any Pixel Address | | 0 | 0 | 0 | No correction |
| Any Pixel Address | xxxxxxxxxxxx | 1 | 1 | 1 | aaaaaaaa |
| Any Pixel Address | xxxxxxxxxxxx | 0 | 1 | 1 | bbbbbbb |
| Any Pixel Address | xxxxxxxxxxxx | 1 | 0 | 1 | cccccccc |
| Any Pixel Address | xxxxxxxxxxxx | 1 | 1 | 1 | dddddd |
| Any Pixel Address | xxxxxxxxxxxx | 1 | 0 | 1 | dddddd |
| Any Pixel Address | xxxxxxxxxxxx | 1 | 0 | 1 | dddddd |
| Any Pixel Address | xxxxxxxxxxxx | 1 | 1 | 1 | aaaaaaaa |
| Any Pixel Address | xxxxxxxxxxxx | 0 | 1 | 1 | cccccccc |
| Any Pixel Address | xxxxxxxxxxxx | 1 | 1 | 1 | bbbbbbb |

FIG. 2C - Radiometric Pixel data Correction

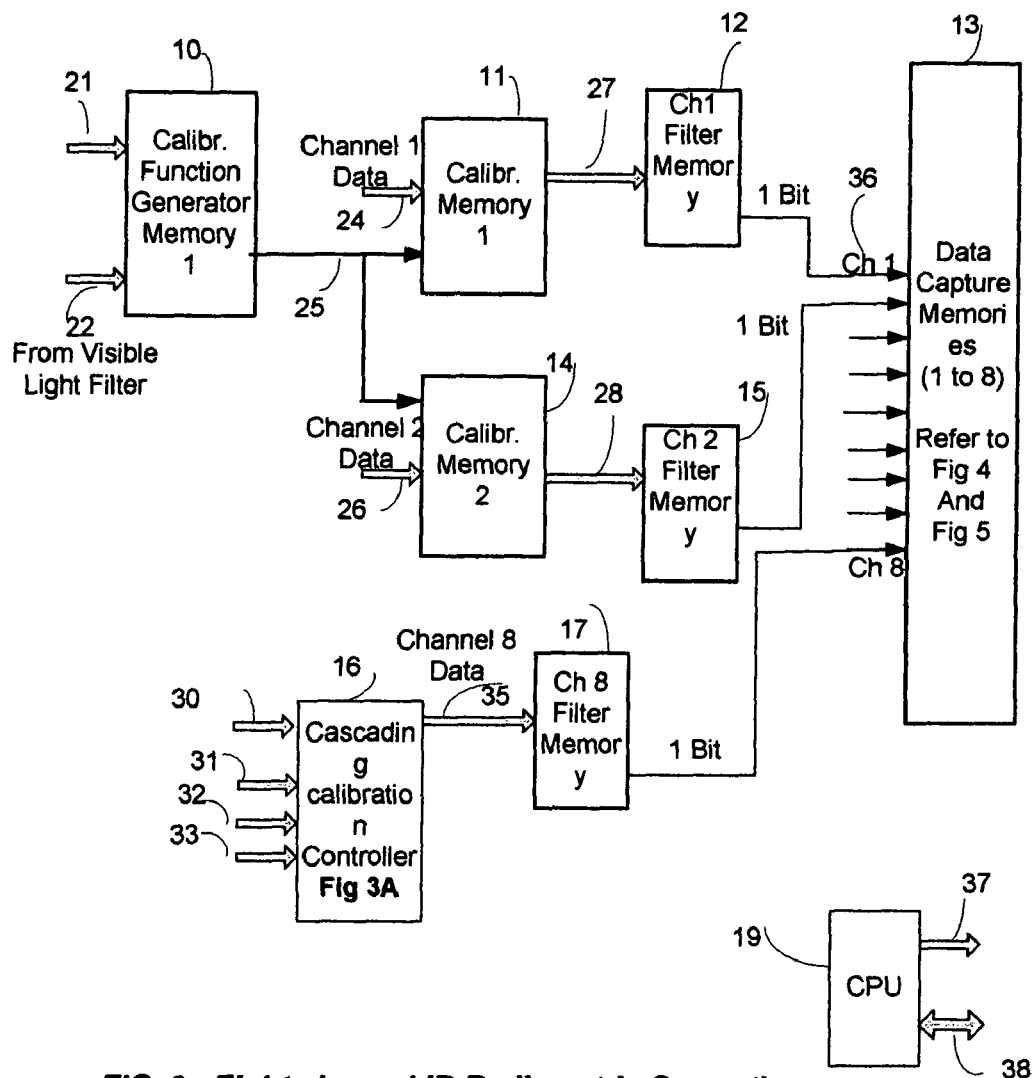
FIG. 3 - Eight channel IR Radiometric Correction, Calibration and Filter

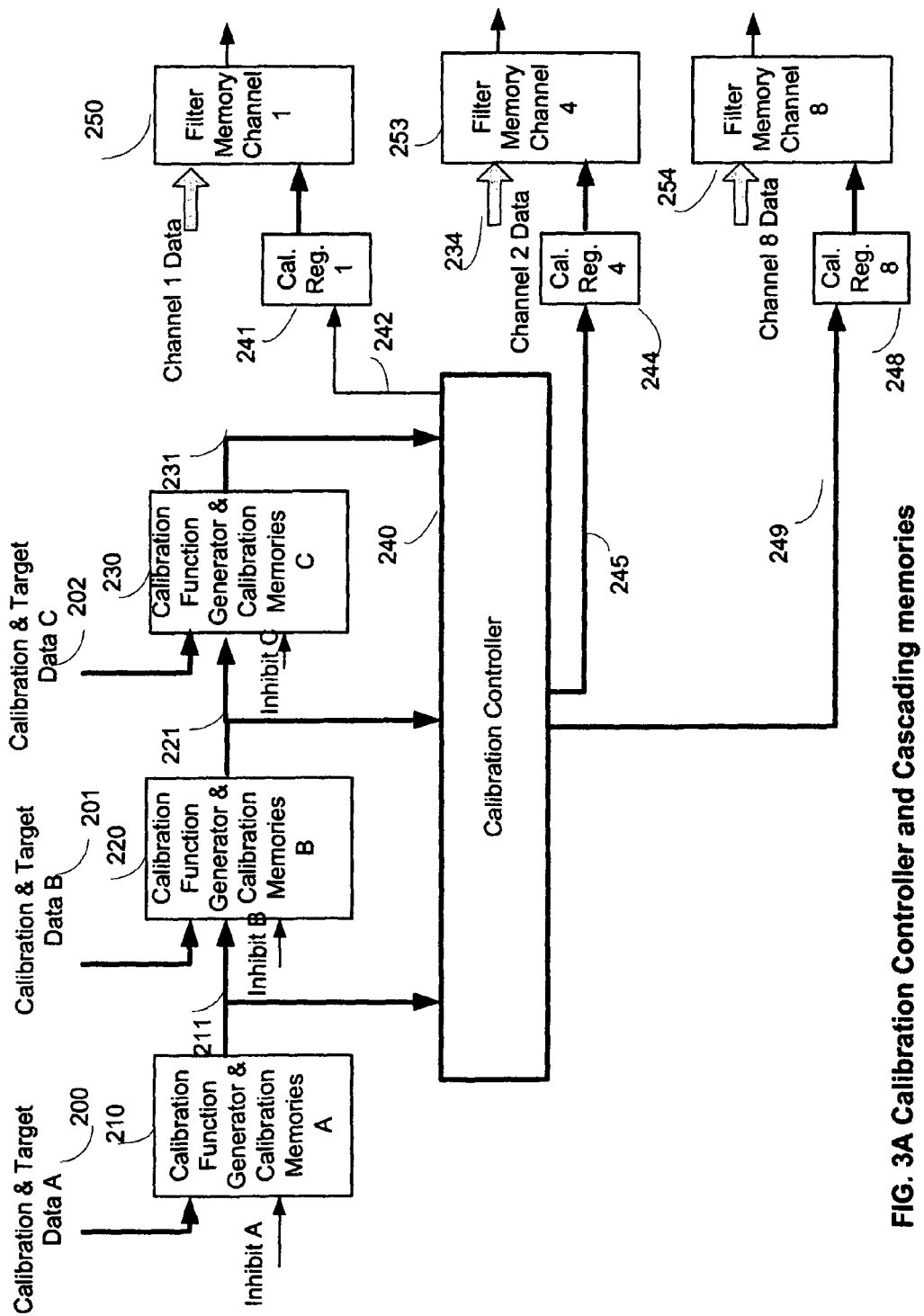
FIG. 3A Calibration Controller and Cascading memories

| (Normalized) Calibration data Intensity | Multiply Channel Data by |
|---|---|
| 0 0 0 0 | 1 |
| 0 0 0 1 | 2 |
| 0 0 1 0 | 3 |
| 0 0 1 1 | 4 |
| 0 1 0 0 | 5 |
| 0 1 0 1 | 6 |
| 0 1 1 0 | 7 |
| 0 0 1 1 | 8 |
| 1 0 0 0 | 9 |
| 1 0 0 1 | 10 |
| 1 0 1 0 | 11 |
| 1 1 1 1 | 12 |
| 1 1 0 0 | 13 |
| 1 1 0 1 | 14 |
| 1 1 1 0 | 15 |
| 1 1 1 1 | |

Min. Atten. (top) — Max Atten. (bottom)

FIG. 3B - Calibration Memory Channel Data Attenuation Table

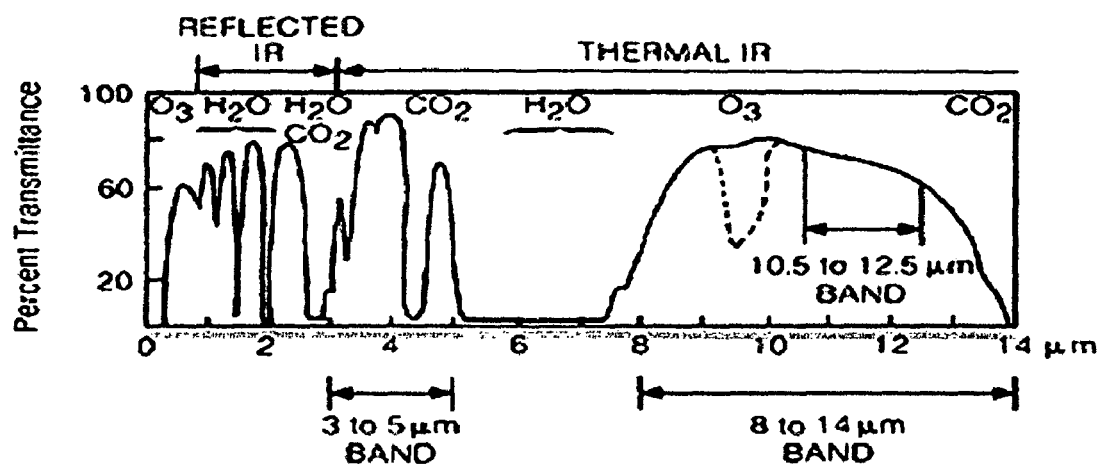
Fig 3D - percent transmittance of various elements

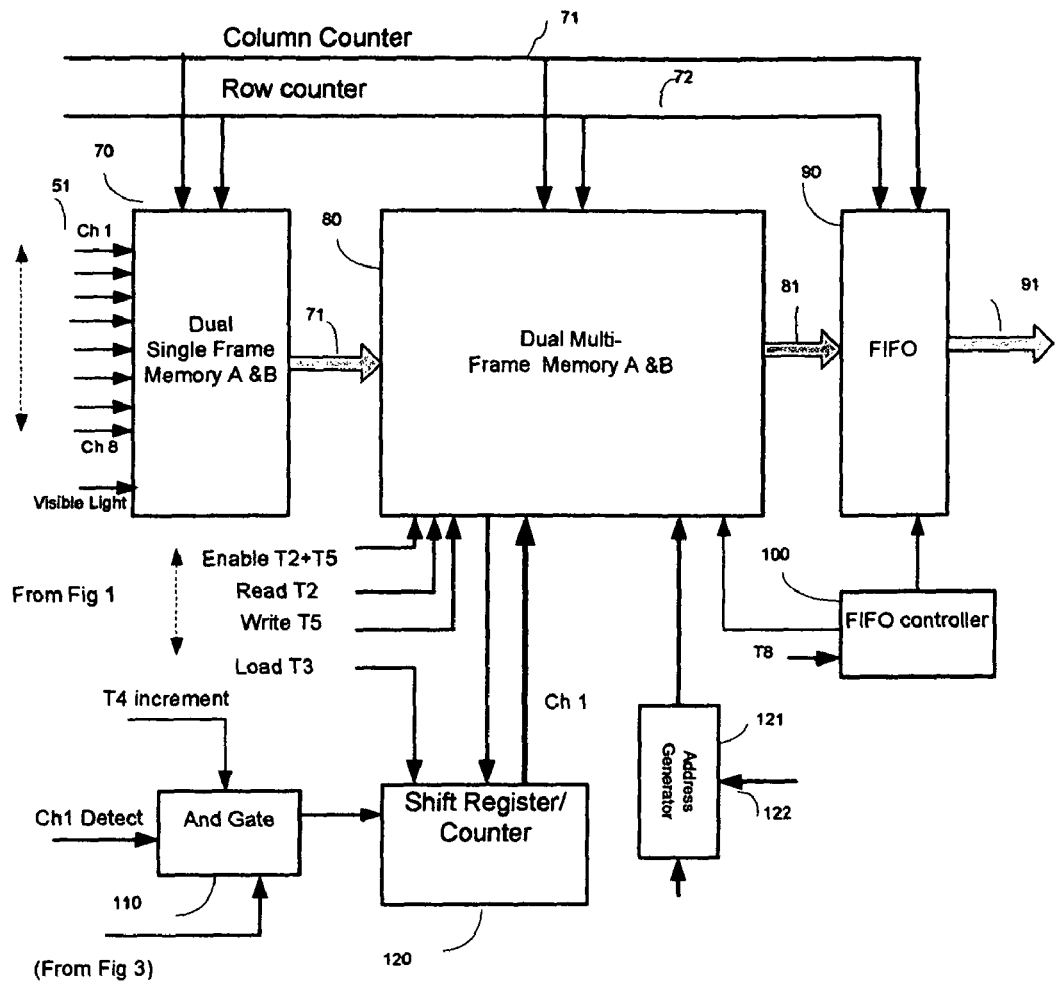
FIG 4 - Multi Frame Channel Detect

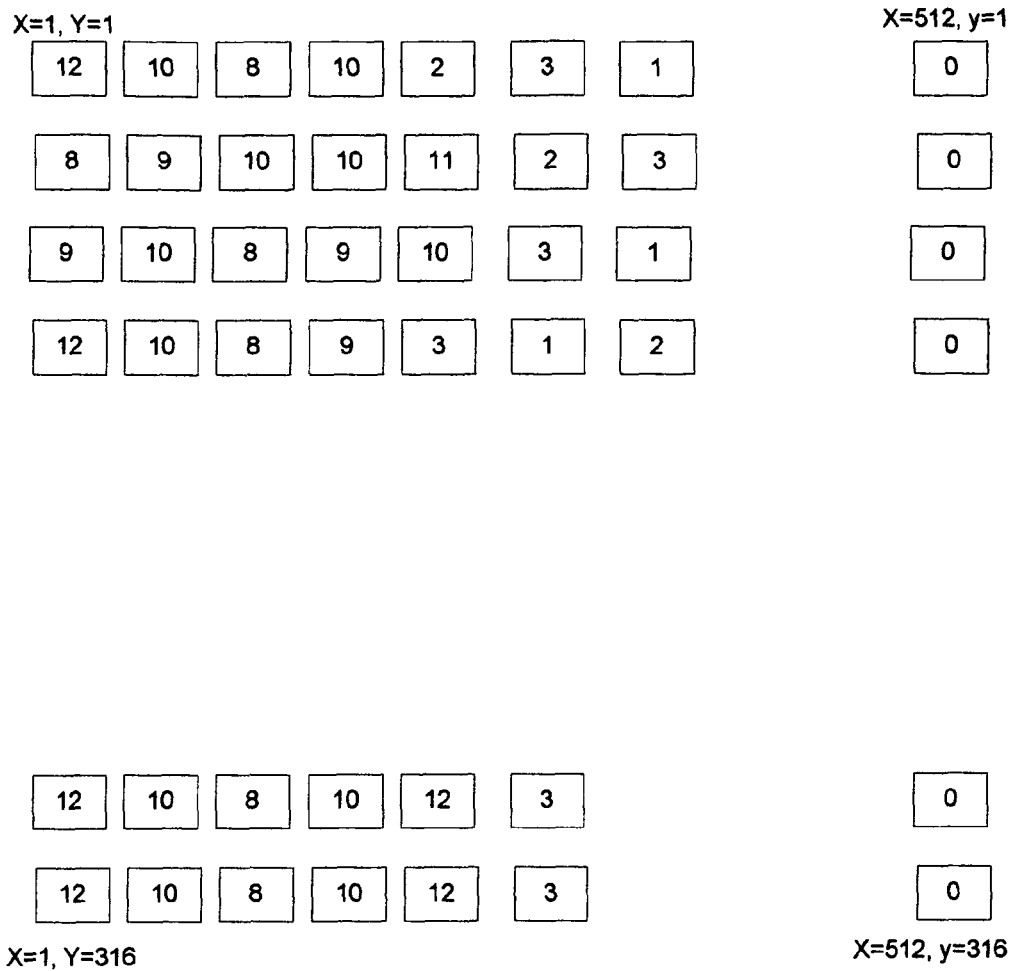
Figure 4A Pixel Detection (accumulation) of a target in a Multi Frame Detection

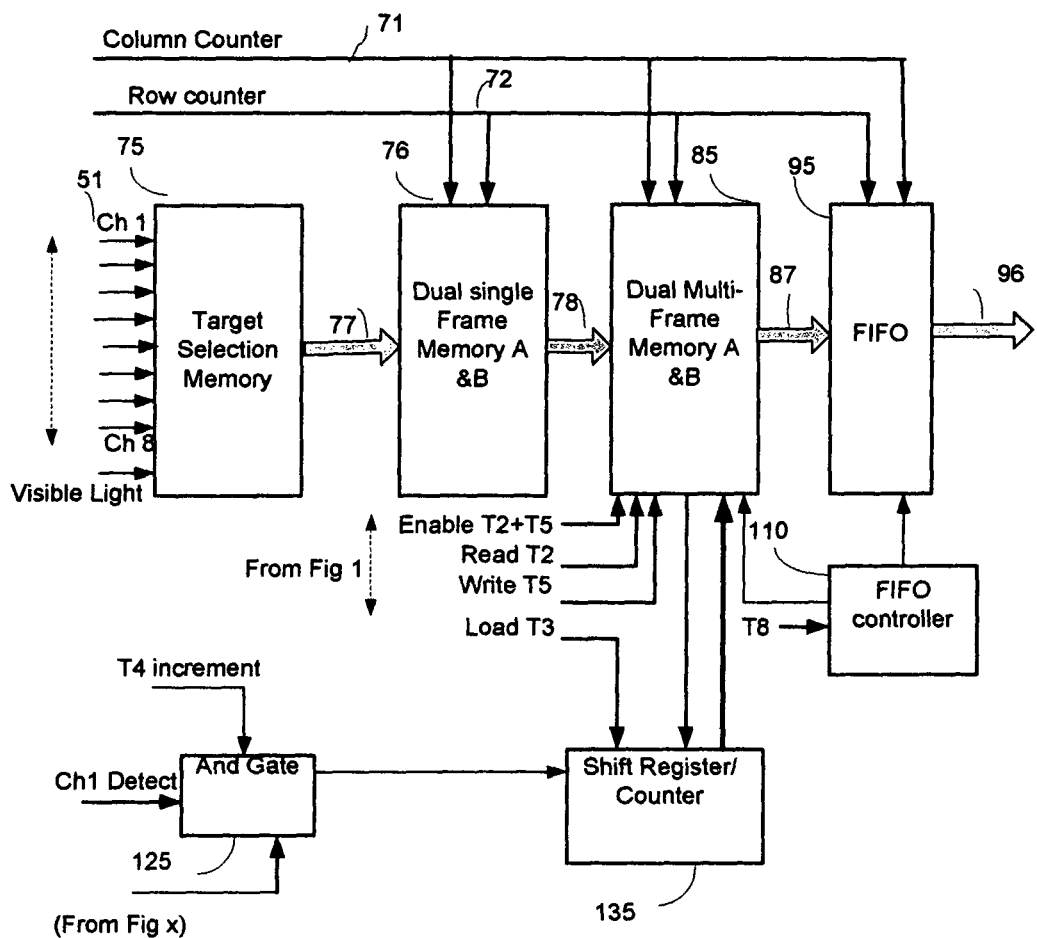
FIG 5 - Multi Frame Target Detector in multiple channels

Measurements

| | | Targets | | | | | |
|---|---|---|---|---|---|---|---|
| | | 2 | 3 | 4 | 5 | 6 | 7 |
| Electro-magnatic Channels | 1 | x | | ? | x | | |
| | 2 | | x | | | x | |
| | 3 | | | x | | | x |
| | 4 | | ? | | x | | |
| | 5 | | | x | | | |
| | 6 | | | | | | |
| | 7 | x | x | | x | | |
| | 8 | | | | | x | x |
| | total | | | | | | |

Referance

| | | Targets | | | | | |
|---|---|---|---|---|---|---|---|
| | | 2 | 3 | 4 | 5 | 6 | 7 |
| Electro-magnatic Channels | 1 | x | | x | x | | |
| | 2 | | x | | | x | |
| | 3 | | | x | | | x |
| | 4 | | x | | x | | |
| | 5 | | | x | x | | |
| | 6 | | | | | | |
| | 7 | x | x | | x | | |
| | 8 | | | | | x | x |
| | total | 2 | 3 | 3 | 4 | 2 | 2 |

FIG. 5A Table for Multi-Frame Detection of Different Targets in Different Channels

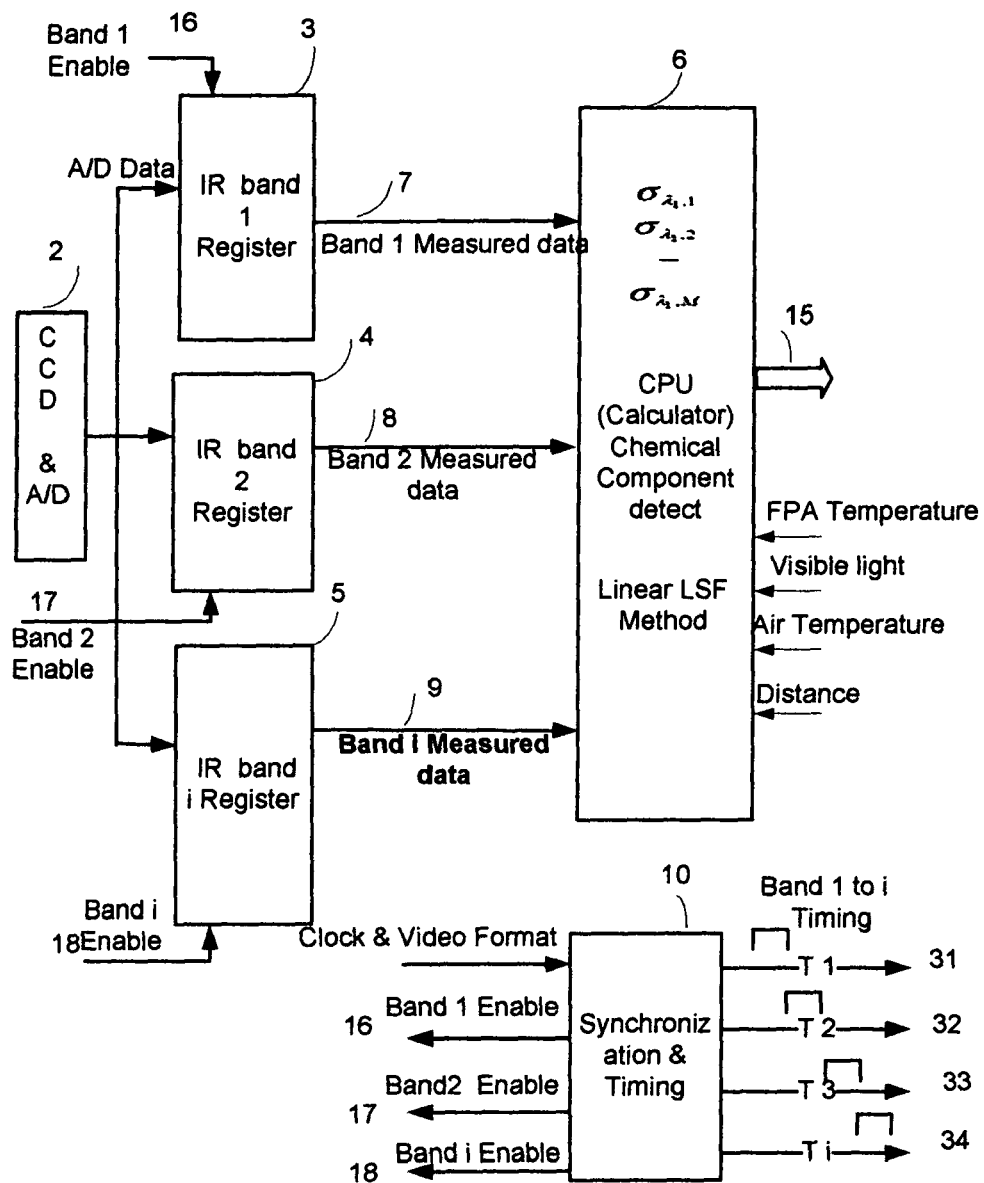
FIG. 6 - Remote Sensing IR chemical Concentration Measurement (CWA's and TIC's) using Linear LSF Method

| 9-11.5 □m | |
|---|---|
| CWAs | Lewisite, Nitrogen Mustard (H-N3), Sulfur mustard (HD), 4-Dithiane, Diisopropyl methylphosphonate (DIMP), Dimethyl methylphosphonate (DMMP), Isoamyl alcohol, |
| TICs | Ammonia, Arsine, Boron trichloride, Ethylene oxide, Nitric acid |
| 4-9 □m | |
| CWAs | Mustard (H-N3), Sulfur mustard (HD), 4-Dithiane, |
| TICS | Boron Trifluoride, Carbon Disulfide, Diborane, Formaldehyde, Hydrogen Cyanide, Hydrogen Sulfide, Nitric Acid, Phosgene, Sulfur Dioxide, Tungsten Hexafluoride |
| Explosives | TNT, PETN |
| 2.5-4 □m | |
| TICs | HBr, HCl, HF |

$$\begin{bmatrix} \sigma_{\lambda_1,1} & \sigma_{\lambda_1,2} & - & - & \sigma_{\lambda_1,M} \\ \sigma_{\lambda_2,2} & \sigma_{\lambda_2,2} & - & - & \sigma_{\lambda_2,M} \\ - & - & - & - & - \\ \sigma_{\lambda_N,M} & - & - & - & \sigma_{\lambda_N,M} \end{bmatrix} \begin{Bmatrix} X_1 \\ X_2 \\ - \\ X_M \end{Bmatrix} + \begin{Bmatrix} Noise_1 \\ Noise_2 \\ - \\ Noise_N \end{Bmatrix} = \begin{Bmatrix} \alpha_1 \\ \alpha_2 \\ - \\ \alpha_N \end{Bmatrix}$$

$$\begin{Bmatrix} X_1 \\ X_2 \\ - \\ X_M \end{Bmatrix}_{LSF} = \begin{bmatrix} \vec{\sigma}_1 \cdot \vec{\sigma}_1 & \vec{\sigma}_2 \cdot \vec{\sigma}_1 & - & \vec{\sigma}_M \cdot \vec{\sigma}_1 \\ \vec{\sigma}_1 \cdot \vec{\sigma}_2 & \vec{\sigma}_2 \cdot \vec{\sigma}_2 & - & \vec{\sigma}_M \cdot \vec{\sigma}_2 \\ - & - & - & - \\ \vec{\sigma}_1 \cdot \vec{\sigma}_M & \vec{\sigma}_2 \cdot \vec{\sigma}_M & - & \vec{\sigma}_M \cdot \vec{\sigma}_M \end{bmatrix}^{-1} \times \begin{bmatrix} \sigma_{\lambda_1,1} & \sigma_{\lambda_2,1} & - & - & \sigma_{\lambda_N,1} \\ \sigma_{\lambda_1,2} & \sigma_{\lambda_2,2} & - & - & \sigma_{\lambda_N,2} \\ - & - & - & - & - \\ \sigma_{\lambda_1,M} & - & - & - & \sigma_{\lambda_N,M} \end{bmatrix} \times \begin{Bmatrix} \alpha_{\lambda_1} \\ \alpha_{\lambda_2} \\ - \\ \alpha_{\lambda_N} \end{Bmatrix} \quad (5)$$

Fig. 6A - CWAs, TICs and explosives that can be detected in specific spectral regions.

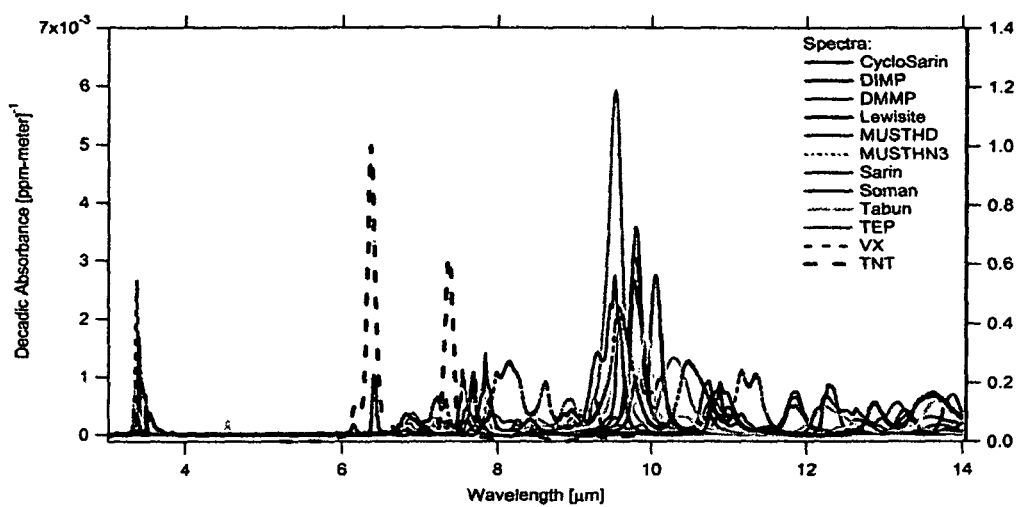
Fig. 6B - IR spectra for CWAs, mustards and TNT.

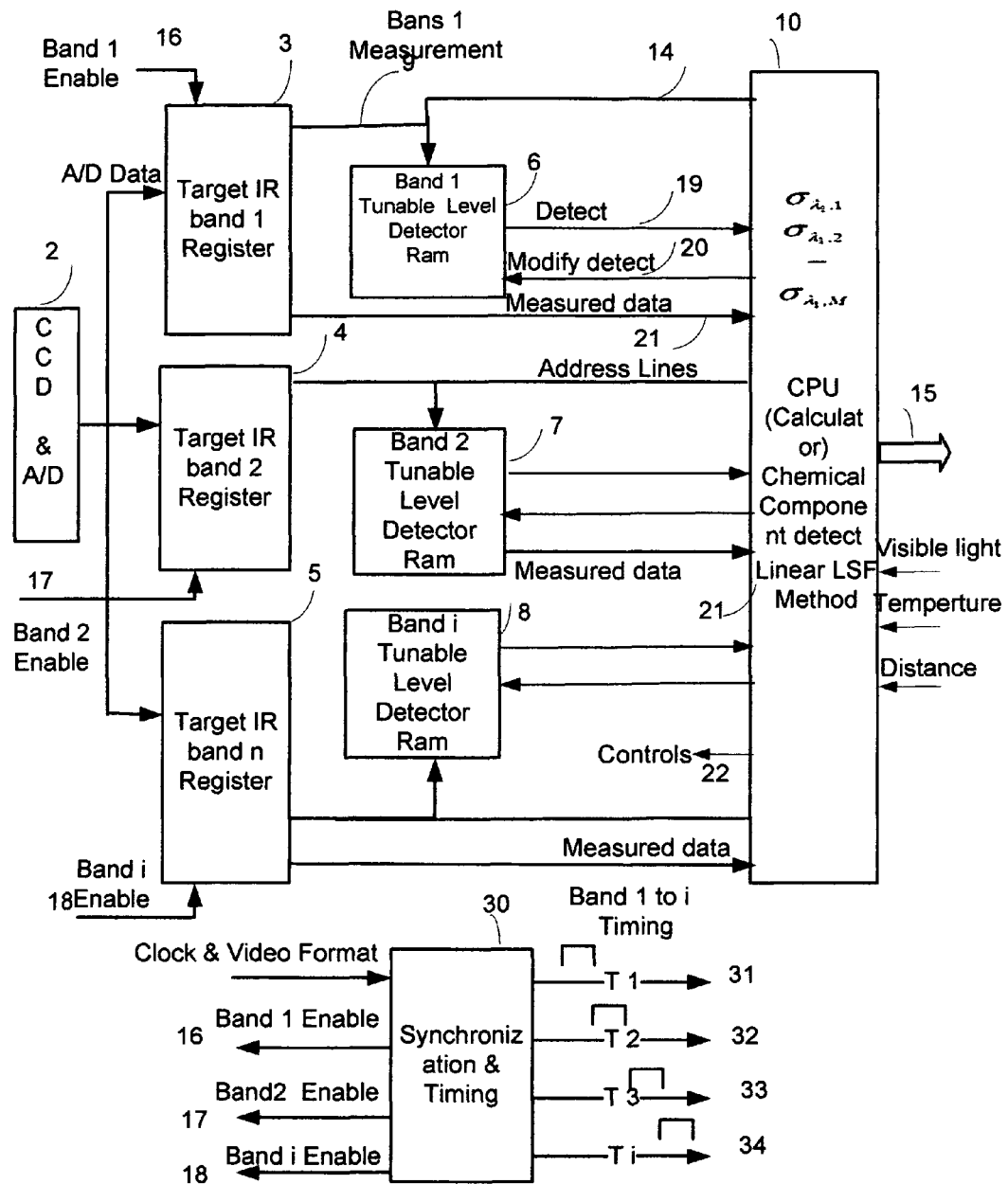
Figure 7 - Remote Sensing IR Level Detector for CWA's and TIC's using Linear LSF Method

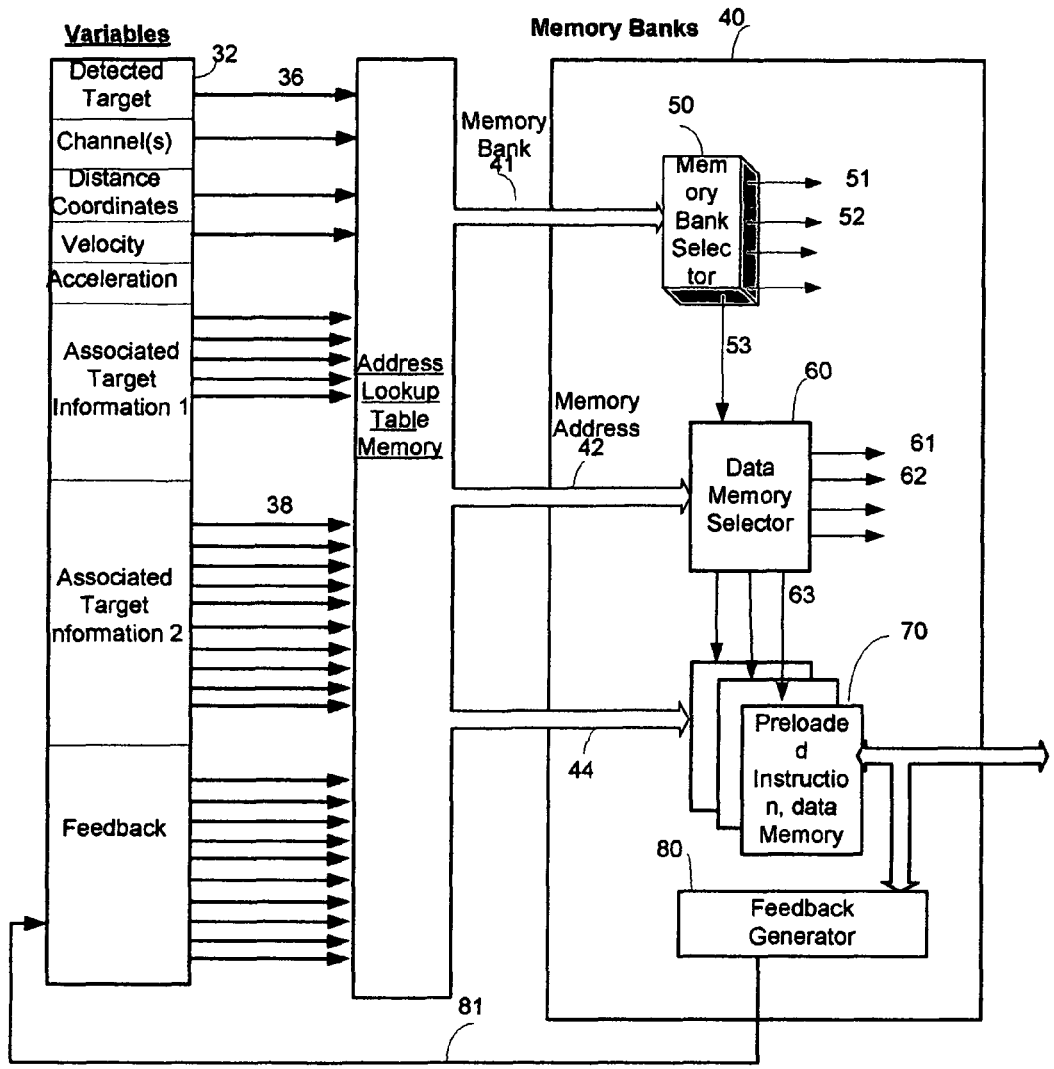
Fig 8 - Associated Lookup Table
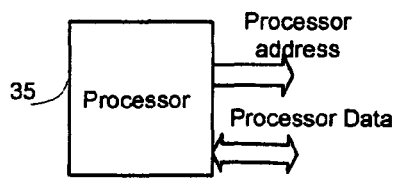

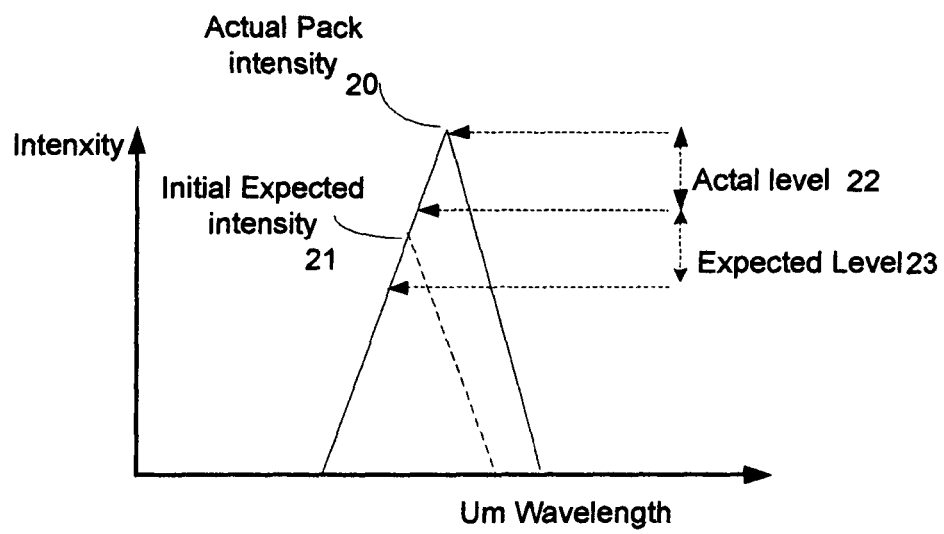
Figure 9 Level Detection and Calibration
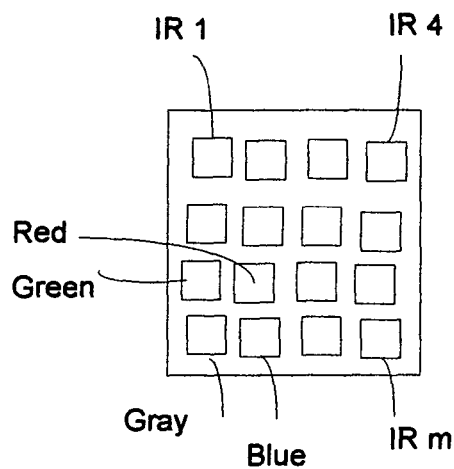
Figure 9A Visible light and IR sensor Arrangement

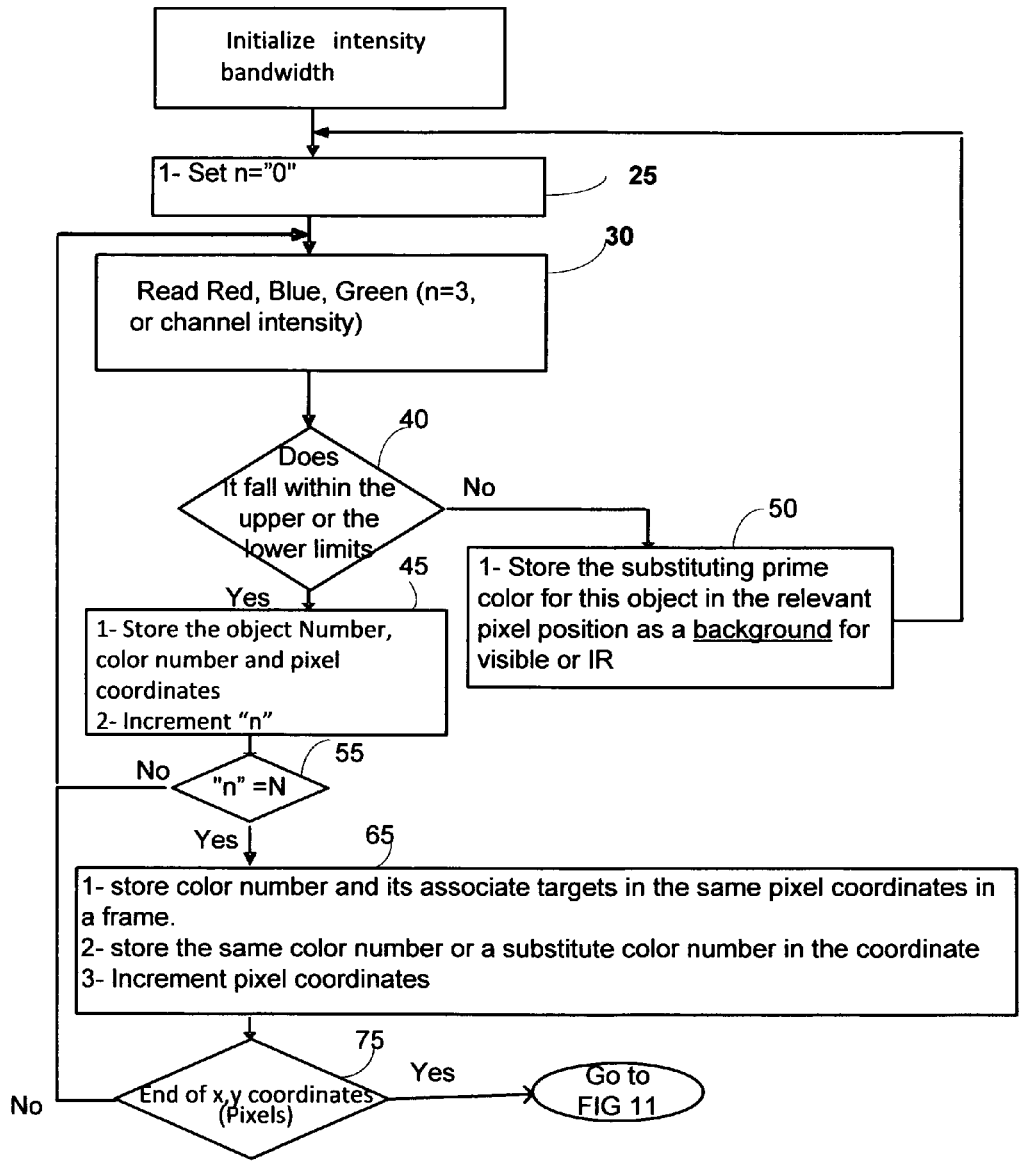
Figure 10 - Software detection of electromagnetic waves, Storing of detected pixels (all colors and targets) in a single frame.

Number of detections (in one coordinate) in a "f" number of frames file as a filter for misdetections.

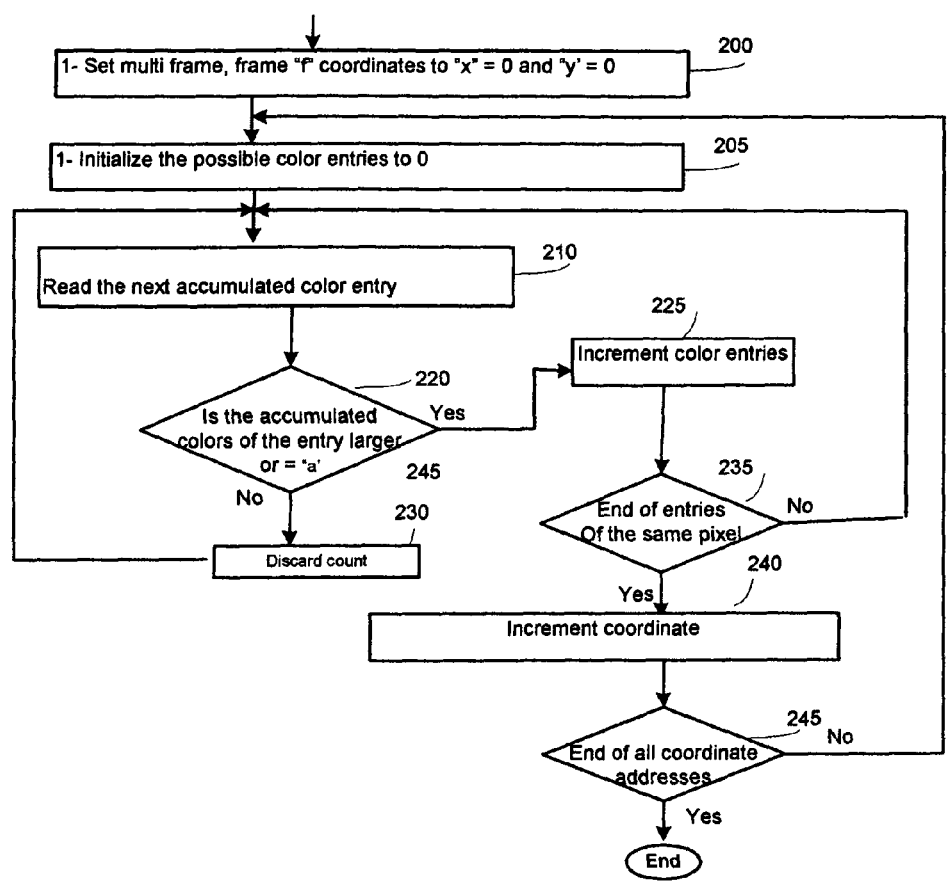
Figure 12 - Associating colors to targets in a multi frame "f"

HARDWARE IMPLEMENTED PIXEL LEVEL DIGITAL FILTER AND PROCESSING OF ELECTROMAGNETIC SIGNALS

RELATED U.S. APPLICATION DATA

Provisional Application Number 61/211,053 filed on Mar. 26, 2009.

FIELD OF INVENTION

The present invention relates to the pixel level digital filtering of electromagnetic waves detected in channels within a band such as IR wherein filtering is performed either in hardware or software, and more particularly to the art of image recognition and image identification with considerations for the presence of environmental elements such as cloud, fog, rain, or other elements.

The apparatus for filtering consist of hardware or software based upon filtering of intensities of video signals received from a video camera or sensors wherein intensities are changed from analog to digital and filtered in real interactive times. The filtered data provides identification of objects, in many channels in which each channel is filtered according to their intensities along with consideration of degree of captured energy with the presence of adverse environmental conditions.

These adverse environmental conditions are detected in channels in which they hamper exact detection of the strengths of the signals. The detected signals (channels) are compensated (normalization), based upon the detection of degradation level (of adverse environmental condition) in other channels against existing empirical values. The degradation values of Visible Light in the presence of adverse environmental conditions are compared to normalized empirical values for calibration.

Considering that resolution of detecting systems is dependent upon many factors, such as the distance of the camera from the source, number of pixels per channel the resolution also dependents upon the number of bits within the A/D converter. For higher resolutions, a higher number of bits in an A/D converter must be considered.

DESCRIPTION OF RELATED ART

U.S. Pat. No. 6,341,257 Hybrid least squares multivariate spectral analysis methods Inventors: Haaland; David M. (Albuquerque, N. Mex.)

A set of hybrid least squares multivariate spectral analysis methods in which spectral shapes of components or effects not present in the original calibration step are added in a following estimation or calibration step to improve the accuracy of the estimation of the amount of the original components in the sampled mixture. The "hybrid" method herein means a combination of an initial classical least squares analysis calibration step with subsequent analysis by an inverse multivariate analysis method. A "spectral shape" herein means normally the spectral shape of a non-calibrated chemical component in the sample mixture but can also mean the spectral shapes of other sources of spectral variation, including temperature drift, shifts between spectrometers, spectrometer drift, etc. The "shape" can be continuous, discontinuous, or even discrete points illustrative of the particular effect.

U.S. Pat. No. 7,433,806 Band model method for modeling atmospheric propagation at arbitrarily fine spectral resolution.

Inventors: Berk; Alexander (Sharon, Mass.), Acharya; Prabhat K. (Burlington, Mass.), A radiative transport band model algorithm has been developed for prediction and analysis of high spectral resolution radiometric measurements. Atomic and molecular line center absorption is determined from finite spectral bin equivalent widths. A new mathematically exact expansion for finite bin equivalent widths provides high accuracy at any desired spectral resolution. The temperature and pressure dependent Voigt line tail spectral absorption contributing to each spectral bin is pre-computed and fit to Pade approximants for rapid and accurate accounting of neighboring-to-distant lines.

U.S. Pat. No. 7,049,597 Multi-mode optical imager Bodkin; Andrew (Wellesley, Mass.)

A common aperture, multi-mode optical imager for imaging electromagnetic radiation bands from a field of two or more different wavelengths is described. Fore-optics are provided to gather and direct electromagnetic radiation bands forming an image into an aperture of the multi-mode optical imager. The image is divided into two different wavelength bands, such as visible light and long-wave infrared. The first wavelength band (e.g., visible light) is detected by a first detector, such as a CCD array, for imaging thereof. The second wavelength band (e.g., long-wave infrared) is detected by a second detector, such as an uncooled microbolometer array, for imaging thereof. Additional optics may be provided for conditioning of the first and second wavelength bands, such as such as for changing the magnification, providing cold shielding, filtering, and/or further spectral separation.

U.S. Pat. No. 6,853,452 Passive remote sensor of chemicals Inventor Laufer; Gabriel (Charlottesville, Va.)

A remote sensor for use as a handheld, mobile or stand-alone sensor has first (12) and second (16) optical paths, light collecting optics, a sample filter (10) assembly positioned in a first optical Path (12), a reference filter (14) assembly positioned in a second optical path (16), a detector assembly to detect the filtered light r other radiation, and a detector output comparison device such as BRD to minimize the effects of common background noise components, differences in light or other radiation source power, and absorption or emission by interfering species.

U.S. Pat. No. 7,132,648 Uniform, non-disruptive, and radiometrically accurate calibration of infrared focal plane arrays using global scene motion Ratiff; Bradley M. (Rio Rancho, N. Mex.), Hayat; Majeed M. (Albuquerque, N. Mex.), Tyo; J. Scott (Edgewood, N. Mex.), Turner, Jr.; Theodore S. (Tucson, Ariz. method of generating an image sequence that includes the steps of detecting scene irradiance using detectors in a focal plane array, generating an output image sequence for each of the detectors based on the detected irradiance, and correcting the output image sequence generated by a first subset of detectors in the focal plane array and the output image sequence generated by a second subset of detectors in the focal plane array using the correction provided to the first subset of detectors.

U.S. Pat. No. 6,415,233—Classical least squares multivariate spectral analysis Inventors:

Haaland; David M. (Albuquerque, N. Mex.) An improved classical least squares multivariate spectral analysis method that adds spectral shapes describing non-calibrated components and system effects (other than baseline corrections) present in the analyzed mixture to the prediction phase of the method. These improvements decrease or eliminate many of the restrictions to the CLS-type methods and greatly extend their capabilities, accuracy, and precision. One new application of PACLS includes the ability to accurately predict unknown sample concentrations when new unmodeled spectral components are present in the unknown samples. Other applications of PACLS include the incorporation of spectrometer drift into the quantitative multivariate model and the maintenance of a calibration on a drifting spectrometer. Finally, the ability of PACLS to transfer a multivariate model between spectrometers is demonstrated.

U.S. Pat. No. 7,151,917 Apparatus and method for deriving a digital image correction factor in a receiver Inventors: Paulus; Tod (New York, N.Y.) An apparatus and method for deriving a digital image correction factor in a receiver. In one embodiment, a receiver circuit may include an error detection circuit configured to receive a digital signal comprising in-phase (I) and quadrature (Q) components and to detect an error in a complex image correction factor, and an error correction circuit coupled to the error detection circuit and configured to modify the complex image correction factor dependent upon the detected error. In one specific implementation of the receiver circuit, the error detection circuit and the error correction circuit may be coupled in a feedback loop, where the error detection circuit may be configured to iteratively detect the error in the complex image correction factor, and where the error correction circuit may be configured to iteratively correct the error.

Other Patents

U.S. Pat. Nos. 5,910,448, 7,592,588, 7,582,259, 6,384,414, 6,671,047, 7,060,980, 5,577,191, 6,969,857, 7,135,682, 6,415,233, 6,507,401,

REFERENCES

Optical detection of chemical warfare agents and toxic industrial chemicals Michael E. Webber, Michael Pushkarsky, and C. Kumar N. Patel[1,2]

Pranalytica, Inc., 1101 Colorado Avenue, Santa Monica, Calif. 90401

Department of Physics and Astronomy, University of California, Los Angeles, Calif.

BACKGROUND OF THE INVENTION

With the emergence of many autonomously operated spaced vehicles, such as robots and UAV' there is an ever increasing need to cut down on timescales of recognition means (filtering, corrections, & calibration) and general image processing. For remotely controlled aircrafts the sensory system need to be changed to reduce the latencies of recognition and tracking. Computer processing and sensing latencies need also to be drastically reduced.

New recommence satellites need to increase their onboard intelligence for autonomous operations by decreasing time in their sensory radiometric corrections/calibration for immediate recognition of moving objects and targets. Reductions in times for electro optical calibration along with increase in onboard decision making process will also reduce manpower personnel to manage them. A robotic operated air vehicle capable of performing radiometric corrections and environmental calibrations will eliminate the need to transfer video data to ground stations and thus reduce command and telemetry large bandwidth requirements (command and telemetry). This means drastic reductions of size and power and elimination of image processing latencies.

For any reconnaissance airborne vehicle, the time to recognize an object and the time to respond to that stimulus is critical. This means drastic time reductions in corrections and calibration of its sensing systems. Ideally, an autonomous system has to immediately adjust to the presence environment conditions, and recognize and track what is told to recognize and track.

For such a system capable of delivering these goals, it needs to mimic human brain activity. A human brain does not solve equations for recognition. Human eye does not solve complex problems to adjust and see objects. Infested it has the capability to associate sensor inputs to an address to the memory cells and read the necessary information. This is the case for almost all human activity to obtain information such as recognition, decision making, prediction (based upon the previous experiences) and a plan.

According to the visionary electrical engineer, Jeff Hawkins author of the book On Intelligence "The human intelligence is rooted in the brain's ability to access memories rather than in its ability to process new data". This invention provides the following:

Achieve a dramatic reduction of timescales for on-orbit IR radiometric system based imperfections, sensor calibrations and IR signal filtering.

Dramatically reduce on-orbit checkout of E-O systems within a frame time periods.

New concepts for calibration that might include compensating for FPA temperature instabilities.

Provides for many point temperature non-uniformity corrections instead of a two-point non-uniformity correction (NUC).

SUMMARY OF THE INVENTION

With the advent of UAV's and robotic systems, there is an ever increasing need to cut or reduce time latencies of recognition (filtering) and tracking and provide autonomous capabilities lacking in present structures and designs. For remotely controlled aircraft, in order to drastically increase autonomous operations the present sensory systems need to be replaced with new technology in which recognition is done instantly.

For any remotely controlled system, it is essential to reduce the operator involvement (to reduce cost, increase detection abilities and reliability), and reduce command and telemetry data for reduction in communication bandwidth. Reduction in communication bandwidth reduces costs, power and improves robustness and reliability of data transfer. This means drastic reduction of data and latency times during image processing.

Human brain does not solve equations for recognition of sensory input. Human eye does not solve complex problems to see an object. Instead it has the capability to associate sensor inputs to an address to the memory cells and read the necessary information. This is the case for almost all human activity to obtain information such as recognition, decision making, prediction (based on previous experiences) and a plan. We humans use the exact methodology in day to day simple actions such as walking.

According to the visionary electrical engineer, Jeff Hawkins author of the book On Intelligence "The human intelligence is rooted in the brain's ability to access memories rather than in its ability to process new data".

The invention consists of the following:

A new methodology in filtering of electromagnetic waves providing very high resolution and narrow bandwidth to replace time consuming filtering technologies of FFT and Kalman Filters. The implementation is in hardware providing real time dynamic interactive processing. It eliminates recording of the data for post processing. A powerful method for correction of system sensory imperfections to be performed in real interactive time on pixel to pixel time base including, optical distortions, noises, shading (light drop) at one side of the CCD line, Different noise patterns between the CCDs used, ADC quantization noise, Amplifier noise, and dust.

A new method for calibration of received IR channels, to compensate for the degradation of adverse environmental elements and to enable dynamic and instantaneous calibration of incoming channels.

The gray code from visible light and actual detection of some environmental elements such as clouds, fog, rain, etc is used to enhance IR calibration.

A new method for detection and measurements harmful gases such as CWA's

SUMMARY OF THE ADVANTAGES OF THE INVENTION

This invention avoids real time processing of complex equations, rather the results of solved equations are (during the initialization) stored in a memory, and then they are utilized based upon different variables pertaining to the processing activity by creating an appropriate address to the memory for the appropriate results that was previously calculated. Utilization of this method, allows for any complex equations or empirically found (by test) data to be used avoiding lengthy time consuming calculations.

The invention provides for cascading the process of radiometric corrections and calibration with the ability to bypass a single process in a series of planned modifications to the received data in a preauthorized fashion.

BRIEF DESCRIPTION OF DRAWINGS AND FLOW CHARTS

FIG. 1A is the detection and filtering of visible light video.

FIG. 2 is the block diagram for correction (calibration) of imperfections in the sensing apparatus.

FIG. 2B is for FPA temperature radiometric correction of pixel data based upon detected FPA or other related temperatures.

FIG. 2C is the cascading radiometric data correction.

FIG. 3 is eight channels IR pixel level digital hardware filter and accompanying hardware for calibration of the detected channels. The calibration is for the adverse environmental conditions.

FIG. 3A is a calibration controller and cascading of calibration memories when the need for calibration for number of adverse environmental elements is large.

FIG. 3B is Calibration Memory Channel Data Attenuation Table.

FIG. 3D is the percent transmittance of various elements.

FIG. 4 is the is a Block Diagram of Multi Frame eight Channel Detect of pixel level, frame level and multi-frame "f" level.

FIG. 4A is a rendition of Multi Frame Pixel Detection (accumulation) of a target in a Multi Frame Detection.

FIG. 5 is the Block Diagram of Multi Frame target detections in a multi-channel scheme associating a channel to target.

FIG. 5A is a table for a Multi-Frame detection of different targets in different channels.

FIG. 6 is Remote Sensing of IR chemical Concentration Measurement (CWA's and TIC's) using Linear LSF Method.

FIG. 6A-CWAs, TICs and explosives that can be detected in specific spectral regions.

FIG. 6B-IR spectra for CWAs, mustards and TNT.

FIG. 7 is Tunable Remote Sensing of IR intensity Level Detection and measurements of CWA's and TIC using Linear LSF Method.

FIG. 8 is a Memory Addressing Block diagram to address micro-instruction sets for execution.

FIG. 9 is a diagram of IR intensity levels of actual and expected for filter tuning purposes.

FIG. 9A is a Visible Light and IR Sensor Arrangement constituting a pixel.

FIG. 10 Software detection of electromagnetic waves, Storing of detected pixels (all colors and targets) in a single frame.

Figure 11:
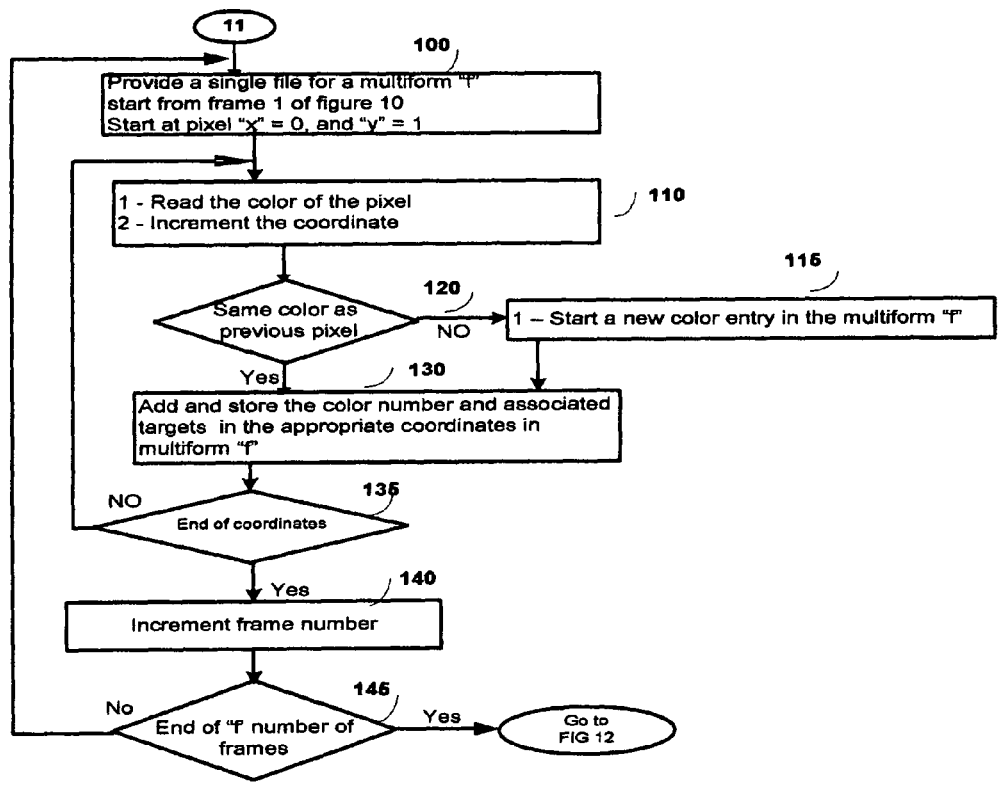

FIG. 11 Number of detections (in one coordinate) in a "f" number of frames file as a filter for misdetections.

FIG. 12 Associating colors to targets in a multi frame "f".

RADIOMETRIC CORRECTIONS DUE TO SYSTEM IMPERFECTIONS

The radiometric imperfections are system based and they vary from system to system. Each system may contain some or all of the following imperfection issues:

Optical distortions and noises
Optics (vignetting, shading)
Defocusing (optics)
Optical Crosstalk
Differences in spectral responsivity (spectral balance)
Flare light (scattering)
Misalignment of illumination and scan line
Shading (light drop) at one side of the CCD line
Different noise patterns between the CCDs used
ADC quantization noise
Amplifier noise
Distortions due to lens or other optics (radial and tangential distortion)
CCD line imperfections, misalignment and overlap
CCD Area imperfections
Grey scale linearity
Dust
Electronic noise (dark signal/thermal noise, dark signal no uniformity, photo response, non-uniformity (vertical stripes, gain/offset) electronic cross-talk
Smear due to movement (linear CCDs)

The imperfections are categorized to affect all pixels or some of the CCD related Pixels. This invention deals with these imperfections individually in a cascading correction memory system that deals with individual imperfections on pixel level or the imperfections on system level. Or instance for FPA temperature variations, it adjusts all the FPA pixels affected due to temperature variation or for some the imperfections on some of the pixels, it makes corrections to those individual pixels. These corrections are done automatically regardless of spacecraft location either in a flying mission or in the factory for development.

Calibration Due to Environmental Degradation

The calibration due to environment degradation covers a broad subject of many papers and researches. It deals with the question of what element it is being used as a calibration standard, the target element, the location temperature and the distance from the both the calibrating element and the target element from the sensor.

For detection of solid objects the question remains as what element or substance is used to dynamically calibrate the received detection channels in which the degree of degradation of the calibrating substance and the target are the same. The question also involves if the calibrating element is gas and its concentrations in the area that may differ from location to location. Therefore if the element chosen for calibration is gas, the concentration of that gas at the location where the target is to be detected need to be measured and compared to an average or normal concentrations (with no presence of additional source of that calibrating gas).

The problem becomes more complex if the intention is to measure the concentration of harmful gases. What gas or other elements are used to dynamically calibrate the system? Therefore in each case of calibration for detection and calibration for measurement must be carefully match and choose the calibrating element for the detection or measurement of the target element.

For remote sensing of detection and calibrations, using electromagnetic CCD type sensors, the spectra related for abortion, reflection and radiation must be carefully evaluated and proper CCD's utilized.

The presently widespread use of filter wheels in satellites, are not suited for all systems. It is too slow if the detection need to be done in real time and dynamically. They are certainly not appropriate for robot type equipment in which a human like real time interactive interface.

The question of use of dispersing element to provide a multispectral detection within a band of electromagnetic waves are also important. Dispersing elements alter the precise location of the target within a field of view of the camera. An object that is detected through a dispersing element has a specific signature in a very narrow band within the field of view. Since the dispersing element deflects different narrow band to different parts of the FPA, the detection of the precise location cannot be achieved by some kind of correction software. The AVIRIS type satellites are not good systems to point to the exact location of a target.

Considering all the above discussion, this invention provides for a system calibration in relation to different aspects of remote sensing ranging from detection for a precise location of the target, considerations that if the target is solid or gas, measurement of harmful gases, distance of the target from the sensor, temperature of the target, the temperature in the vicinity of the target, and others.

This invention combines the contribution of many ranges of electromagnetic spectra as a tool for precise calibration, including the use of visible light to assist in calibration decision making process. As far as the degree of introduction of optics are concerned, the more electromagnetic signals pass through or reflected by mirrors or other optical elements, the more distortions one might expect. For this reason, this invention intends to work with the least amount of optics in the path and relies on the present trends towards the increase of number of pixels within an FPA, increase in the number of sensors sensitive to a narrow bands of electromagnetic waves including introduction of visible light prime colors to be incorporated with other very narrowband sensors to be organized in pixels containing maximum number of very narrow band sensor to increase the detection process resolutions and accuracies exponentially. For in instance For a 10 bit A/D converter, its resolution to identify one color within the visible spectrum is one in $(1024**3)$ colors=one in 1,073,741,824 number of colors.

The proven power of exponential increase in the accuracy, resolution of detection of visible light can be expanded to incorporate more narrowband filtering of IR (such as primary colors of the visible light) to improve calibration and detection process drastically.

The FIG. 3D depicts the percent transmittance of various elements such as $H_2O$, $O_2$, $O_3$, and $CO_2$ in 0.4 to 2.5 micrometer spectrum wavelength. $H_2O$ and $CO_2$ energy transmittance is zero in wavelengths 1.3 to 1.4, and 1.8 to 1.9 micrometer wavelengths. The element $CO_2$ has the heights transmittance in wavelengths 2.0 to 2.4 micrometers. As mentioned earlier this invention, for calibration purposes, the detected strengths of these signals in their respective bands of minimum and maximum percentage transmission can be detected and compared to a known value and the results used to normalize regular data channels accordingly.

For a precise calibration, a system of Tunable Filters Memories is used to detect intensities of gases and measure their concentration values.

DETAILED DESCRIPTION OF THE INVENTION

Those having ordinary skills in the art may be able to make alterations and modifications what is described herein without departing from its spirit and scope. Therefore, it should be understood that what is illustrated is set forth only for the purposes of example and that it should not taken as a limitation in scope of the present apparatus and method of use in regard to the hardware and softer filtering of electromagnetic waves including visible light and JR.

The above-described drawing figures illustrate the described apparatus and its method of use in at least one of its preferred, best mode embodiment, which is further defined in detail in the following description.

FIG. 1

Figure 1:
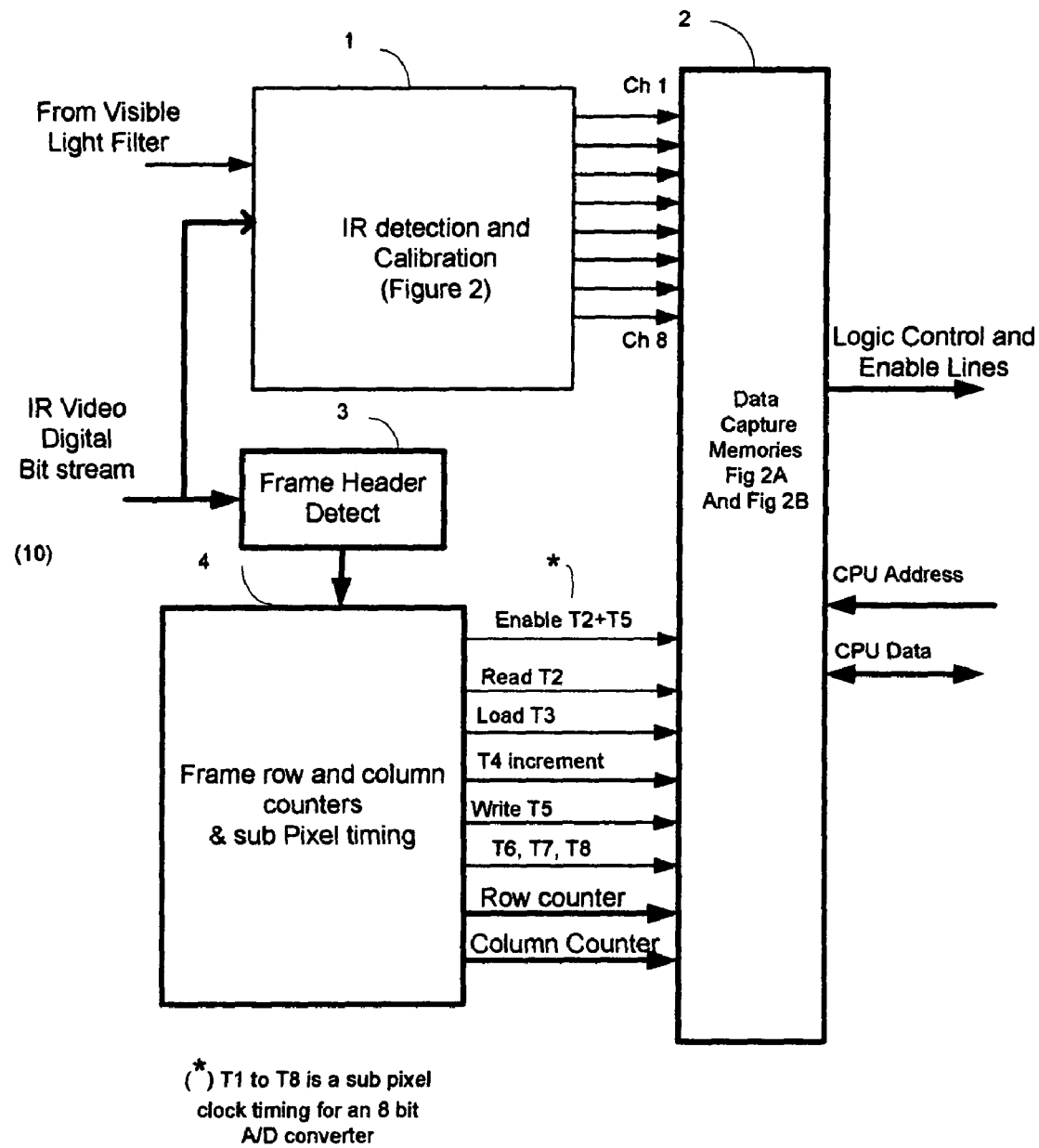
FIG. 1 is the Video Synchronization and Control Logic Block Diagram, including the generation of the row and column counters.

Referring now to FIG. 1, Block (3) is the diagram of the Video Synchronization and Control Logic that receives any one of the eight video bit stream for synchronization to the header of the frame. Block (4) receives the IR digital video frame synch and generates pixel row/column addresses, sub pixel clock timing (control timings to write the detected 8 channels in different memories). Block (1) receives data bits from all eight channels, calibration data for all the 8 channels, visible light intensity data and ground supplied calibration data. It supplies detect no detect signals foe each one of the 8 channels to the eight Data Capture Memories Block (2). Block (2) interfaces with the main CPU and generates control logic signals for detailed hardware implementation. FIG. 1A is the block diagram of visible light filtering. This invention treats the other bands of frequencies in the electromagnetic spectra similar to the visible light filtering to achieve highest possible resolution.

Radiometric System Induced Imperfection Correction

Referring now to the block diagram of FIG. 2 for FPA temperature corrections and other radiometric imperfections. Block 55, receives pixel data along with normalized temperature of the FPA as an address to the temperature correction memory. The data within this memory is pre-written in which the address containing the sensor pixel data along with the normalized FPA temperature is the corrected data according to the normalized temperatures. FIG. 2B is a chart showing the address to the memory including normalized temperature and the output data. The normalized temperature is shown as a four (most significant bits) binary numbers wherein each one of the four bits contains 256 memory locations (that are not shown). The memory data for each one of 256 locations are pre registered (calculated or empirically) to indicate a corrected value. The uncorrected pixel data is shown as eight bit xxxxxxxx. The corrected data in memory) that no corrections are needed. Of course, this is a simplistic example to convey the method.

Referring again to FIG. 2, the row and column addresses (46), corresponding to each pixel is the input to Radiometric Correction Control block 56. The data for this memory is pre-loaded to select an origin of a data and correct no correct information intended for each Cascading Correction Memories, Blocks 57 and 58.

The output of the Radiometric Correction Control block 56 is a set of data corresponding to each cascading memory that is the input to the Cascading Controller 59. The cascading controller also receives the clock timing with the data transfer of each pixel, and allocate a certain time period to enable (direct) data from a previous stage memory to the next stage memory cascading as shown in FIG. 2. The output of the Temperature Correction memory 55 is enabled by signal (49). The cascading memory controller is (43). FIG. 2C is a table showing control lines for each one of the cascading memories.

(contents of the memory) are designated as an eight bit yyyyyyyy. There are two instances 0111, and 1000 (512 locations Blemishes of CCDs, and other distortions such as:
Calibration Referring now to FIG. 3, for IR Filter calibration and Detection for an 8 channel of IR calibration and filtering techniques. Each one of the channel data is a parallel bits from a CCD or corresponding A/D Converter. Higher channel (32 or more) filtering will utilize the same method with slight variations in the hardware implementation.

The block diagram is the hardware implementation for calibration of data channels due to adverse environmental conditions and filtering. The channels are previously undergone radiometric correction for system imperfections (FIG. 2), and then they are calibrated before filtering.

An environmental factor calibration (normalization, attenuation) for each channel is based upon comparing a set of wavelengths data intensities (21, 30, 31, 32 and 33), set aside for calibrating data channels that are received in adverse environmental conditions. These calibration channels are compared with a known intensity magnitude received in an ideal environment condition. The result of comparison provides a calibration factor to calibrate normal channels. Calibration factors are generated either for a specific data channel or a group of data channels; with the ability of cascading several calibration channels to arrive at the final calibration factor to be shared by to calibrate many data channels.

Block 10 is a Calibration Function Generator Memory, in which it receives the calibration intensity from calibration sensor and generates a calibration factor (25). This calibration factor is sent to the Calibration Memories 11, and 14, that receives the regular data channel and calibrates it with the calibration factor. Block 16 is a cascaded Calibration Factor Generator and to calibrate regular data channels that will be discussed later.

The generated function is amended to the received channel data intensity (24, and 26) and the combination is used as an address to Calibration Memories (11 and 14). The data within the Calibration Memories are pre loaded during the initialization, in which the calibration factor is the most significant bits that points to a set of calibrated data addressed by the received channel data.

FIG. 3B is a table showing calibration factor and corresponding multiplication number that compensates for (the effects of environmental causes) on regular data channels. The multiplication is done in the memory wherein for each channel intensity and calibration factors a corresponding calibrated data (27, 28 and 35) input to the filter memories.

In the above example, a linear correction factor (multiplication) is showed. This correction factor can be any mathematical formula or derived experimentally. The attenuation factor is the degree of increase or decrease of the detected channel data. The contents of Channel Filter Memory is adjusted such that with attenuation factor, it would represent an actual data without environmental attenuation.

In a different embodiment shown in FIG. 3A, is a method for determining attenuation factor and correction factor is displayed. Blocks 210, 220 and 240 represent a calibration factor generation for only three environmental elements. It shows calibration data (200) is the input to the calibration memory block 210. The calibration memory arrangement structure is such that the output calibration factor from one stage (211) Block 210 is fed to the next stage calibration memory address block 220, and so on. Inhibit signals, (212, 222 and 232 initially or dynamically set by CPU), will allow the calibration scale from previous stage (to set calibration scale to the next stage 221 to the next stage. This implies that the calibration factor from the previous stage needs to be considered as another scaling factor (FIG. 3A) or inhibited. If it is inhibited the content of the calibration memory will set as if previous pre scaling did not exist.

FIG. 1A is the filtering hardware block diagram for visible light, wherein specific colors are detected also on pixel level. The visible light filter will isolate specific RGB colors and will look for other environmental elements that disturb the IR detection. The visible light detections of elements such as fog, rain, cloud, and sand storms, are amended to their specific IR detection (within a band) and are used to normalize the received IR intensities of other 8 channels. FIG. 2 also provides for the gray color of the visible light. This data provides for the calibration due to illumination Factors.

Calibration Due to Illumination Factors

The incoming solar energy varies greatly with wavelength, peaking in the range of visible light. In order to improve identification of object in the presence of solar energy, the gray code value from a visible light filter FIG. 1A will be routed to the input of the Calibration Memory (13). The contents of the Calibration Memory will be arbitrarily adjusted to take into the considerations, both the IR calibration data and visible light identification as well.

The IR Calibration Data and the visible light calibration data need to be adjusted to have the same exact field of view. The combination of IR Calibration Data and Visible Light Calibration Data need to be adjusted as if it is received from the same field of view.

The combinations of specific environmental element detection in visible light or any band within the 0.4 to 2.5 micrometer wavelengths will assure the proper scaling and normalization of any one of the 8 filters.

Referring again to FIG. 3, the detected calibration intensities designated by (11, and 16) are the input to Calibration Memory Blocks 10, and 15. The input calibration data is from one or more of detected calibration sensor or filters that detect environmental elements that distort the detected intensity of a channel under study. The output of the calibration memories are the amending address input to the Filter Memories. In addition to the Calibration IR Filters, there is also an input from the visible light filter detectors representing the gray intensity and or the visible light detection/no detection of an object in the same pixel coordinate shown in FIG. 1A.

Referring now to FIG. 2A, shows the Calibration data intensity (as an input to the calibration Memory), and the corresponding pre loaded attenuation factor, to attenuate one or more channels. Due to limitation in the size of the page, only a four bit calibration data is shown. It could be any number such as 8, 12, or 16. The pre loaded data (multiply data channel by) is a scaling factor in which an attenuated channel data is multiplied. This scaling factor is amended to the detected intensity of the channel data bit to the address of the Channel Filter Memory.

Each one of the 8 channels will require specific scaling of the detected energy. A set of calibration data or a scale factor (designated by 12), of 4 bit (16 levels) or 8 bit (256 levels) or any numerical quantization level, in combination with the Channel Intensity data (designated as 21, 31, and 41), are the input to Calibration Memory.

As is discussed previously, the detect/no detect of the raw energy will depend on the intensity of the channel as well as scaling factors. In other words, the one bit representing filtering will depend upon the input intensities and detection of intensities of environmental factors.

The intensities from each one of the detected and calibrates channels are stored in a dual A/B register (50).

Detection

Referring again to FIG. 2, we find Blocks 11, 14 and 17 Tunable Filters Memories to provide for tunable band pass, low pass, or high pass filtering of the detected 8 channel intensities. The memories will provide a tunable device to detect a band of intensities, band pass (or low pass or high pass).

The memories consist of 10, 12, or 16 bit addressing capability (corresponding to the resolutions of the A/D converter) and one bit of detect no detect data. For filter implementation, the received filter intensities are set to the address lines of the memory, and memory data bits are set to a "1" for the band of intensities that need to be detected and "0" everywhere else. When there is a match between the received signal intensity strength (that is the address to the memory) and the initially set value a "1", a signal (36) (detect or no detect) is generated and sent to the Data capture memory Block 13 for further data processing.

Referring now to FIG. 9, we notice that point 20 is the actual intensity and 21 is expected intensity. This is because; the maximum strength of a signal, at particular wavelengths may not coincide with the filtering characteristics of a relevant sensor. For maximum intensity measurements of the signals the memory is tuned by changing the location of "1" from the expected to the actual for certain tolerances (or band pass filtering) for =/–n number of locations in the vicinity of the received band.

Multi Frame Channel Detector

Referring now to FIG. 4 that shows block diagrams for a Multi Frame Channel Detection of eight channels for statistical purposes. The Single bit for each one of the 8 channels (from FIG. 3) representing a single pixel detect/no detect data bits are the input to one of the dual registers A, or B (70) to record the detection of any or all of the 8 channels. The detector data for all the 8 channels (51) is written into one register, while the second register is used to write the data into one of the Dual A, or B (80) single frame memories.

The column and row pixel address counters (71 and 72) are the input address to an eight data bit single frame memory (70) organized in dual fashion. Each memory data (8 bit) corresponds to eight pixels of 8 channels of a frame. While the data is written into one memory, the data is read from the other, to be written into one of the dual Multi Frame memory A, and B. The goal is provide the statistics of total number of times that anyone of the eight channels within a pixel location registers detect or no detect signal. Once a frame data is read from one of the memories, it gets reset for the next frame data to be written into it. The Dual registers in FIG. 3 are also changed for the data to be written into one and read from the other.

Referring again to FIG. 4, a pair of dual Multi-frame Memory (80) is used to register detect/no detect data from the Single Frame Memory into the Multi-Frame Memory of "f" number of frames.

With the present technology of memory capacity, a single memory can be used to accommodate "f" consecutive frames. Each address corresponds to eight channels. Prior to writing the Single Channel Memory Data into the Multi-Frame Memory, the new data is added to the previous data for the total number of scores within "f" number of frames. This done addition of 3 bit counters (121) amended to the row and column addresses to perform additions within pixel timing.

During the times when data is being written into the dual memories, for each one of the data (bytes) the contents from each bit is examined for detect/no detect representation. If the value is "1", one count is added to the previous count in a multi-frame of "f" frames. After completion of reading from Frame Memory, it is reset and set for the next frame's register to Frame Memory Write cycle.

On the subject of multi-frame recording, the period of "f" number of frame should be short enough so that an object moving in certain speed will not be moved from one pixel to another. So there is a trade-off for the distance between the observer and of the target distances and motions with respect to the period of "f" number of frames. Upon completion of "f" data frames, the content of Dual multi-Frame Memory is written into a FIFO (90).

The further the distance of the satellite or a plane to the target, there is a lower possibility of in between pixels motions of the target. For target moving in a close vicinity of the detector, the Pixel count level of the target should be adjusted to a known value and the decision on the number of frames "f" should be made. This means that the pixel count of a target needs to be considered for selection of "f". This will be done on the analysis level after the targets are separated by Gap.

To provide a visual representation of the detected channels an arbitrary color is allocated to each channel. Under certain conditions, this color representation can also be used in Multi-Frame representations of detected channels.

Multi Frame Multi Channel Target Detection

Referring now to FIG. 5, for Multi Channel Multi Frame Target Detector for eight channels. With the exception of incorporating a Target Detect Memory Block (75), associating the number of channels in which a target is detected (in multi-frames), i.e. associating detect no detect of several channels to detection of various targets. Different targets can be detected in multiples of different channels.

Target Detect Memory (Block 75) receives the detect/no eight bit signals for 8 channels from which is used as an address to the memory (from FIG. 3 at the end of each pixel time). Each one of the data of the Target Detect Memory is set to indicate the expected targets to be detected in different channels. Since each target can be detected in anyone of the eight channels, the output data of the Memory will be an eight bit, with each bit representing detection or no detection of a target in multiple channels. The number of data bits of the Memory can be increased for detection of more than eight targets.

This data is fed to the Dual Single Frame Memory 76, wherein the address to this memory is the pixel coordinates of a video frame. This continues to the lat pixel in a frame, in which this memory is enabled for data output, read. The other Single Frame Memory (76) is enabled to be written into. At this point the output of the Single Frame Memory (76) contains the detection information of all the targets.

This single frame data is made available to the input data lines of the Multi Frame Memory (85), in which the address is the pixel coordinates of each frame. During the times when data is being written into the dual memories, for each one of the data (bytes) the contents from each bit is examined for detect/no detect of a target in different channels, and if it is a "1", one count is added to the data representing total detection of a single target in a multi-frame of "f" frames. After completion of reading from Frame Memory, it is reset and set for the next frame's register to Frame Memory Write cycle.

Concentration Measurements of CWA's and TIC's

In addition to sensitivity and fast response time, the very important parameter of a sensor is selectivity i.e. an ability to operate with acceptably low probability of false positive (PFP) readings in the presence of interferences typical in indoor and outdoor environments. In fact, the lack of selectivity may become a critical problem when sensing realistically contaminated air because of high economic costs of frequent false alarms. Therefore a model allowing prediction of the sensor PFP as well as the probability of false negative (PFN) would be very valuable tool for sensor developers and users alike. This paper presents an analytical model allowing to quantitatively evaluate performance, i.e. sensitivity and selectivity of absorption spectroscopy based techniques for the detection of CWAs and TICs in realistically contaminated ambient air.

IR absorption spectroscopy is a powerful tool for trace gas detection because a vast majority of polyatomic molecules including CWAs, TICs and explosives absorb light in the wavelength region from 3 to 14 um. Table 1 shows the IR spectra of nerve and mustard gases and Table 1 gives more comprehensive list of both CWAs and TICs absorbing between 3 and 11.5 um. The required sensitivity for CWA detection is determined by the toxicity levels of particular agents, most of which reasonably well documented. The concentrations and related health effects for Sarin (GB), a typical nerve agent CWA, are summarized in the FIG. 6A.

The equation in FIGS. 6A and 6B provide needed mathematical tools for concentration measurements of multi sensor which relies upon acquisition and analysis of a complex spectrum. For practical application of the presented model one needs to specify the following parameters:

1. A set of concentrations, $X_i$, of all expected targets and interferences
2. Spectral range of a spectrometer and absorption spectral library of all the expected ambient air constituents which absorb appreciably within a identified spectral range.

Referring now to the block diagram of FIG. 7, for precise concentration measurements of gases in which only few substance are in the sample for measurement in which their IR spectra may not overlap. Blocks 6, 7, and 8 are the Tunable Filters Memories to detect certain intensities of the received sensor data. The memories will provide a tunable device to detect a band of intensities, band pass (or low pass or high pass).

The memories consist of 10, 12, or 16 bit (corresponding to the resolutions of the A/D converter) and one bit of data.

For detection and measurement, the received filter intensities are set to the address lines of the memory, and memory data bits are set to a "1" for the band of intensities that need to be detected and "0" everywhere else. When there is a match between the received signal intensity strength (that is the address to the memory) and the initially set value a "1", a signal (19) (detect or no detect) is generated and sent to the CPU. Referring now to FIG. 9, we notice that point 20 is the actual intensity and 21 is expected intensity. This is because; the maximum strength of a signal, at particular wavelengths may not coincide with the filtering characteristics of a relevant sensor. For maximum intensity measurements of the signals the memory is tuned by changing the location of "1" from the expected to the actual for certain tolerances (or band pass filtering) for $=\backslash-n$ number of locations in the vicinity of the received band. CPU Block 10 is used to modify the location of "1's" in the memories. When CPU receives a "1" signal, it will input the actual intensity of the signal from registers 3, 4 and 5 and compares it to the expected value. By the process of averaging, If the medium received value do not fall within the expected value, it changes the location of "1's" in the Tunable Filter Memory.

Software Filtering of Electromagnetic Waves

The software filtering for visible light electromagnetic waves is treated the same method as IR. Each IR channel is treated as a prime color in visible light. The visible light filtering is based upon the RGB intensities of a pixel, this means three set of value for one visible light pixel.

Software Filter and Processing

Note: This invention treats the filtering of electromagnetic waves, including IR, Visible, and others the same way. Although present divides the visible spectrum into three prime colors, there is no reason not to increase the detection of visible light in more channels the same as IR. This is what is done in IR frequency spectrum, sometime up to 224 channels.

In order to provide an understanding of filtering concept of electromagnetic waves, a channel used in IR and will correspond to prime colors in visible light. FIG. 10 is a flow diagram for visible light. We can substitute "channel" when we describe certain group of frequencies in IR Software Initialization the following initialization will take place at the start of the program:

Set up pixel designations that are part of the frame format bit stream. It starts with a header and then different positions of Red, Green and Blue depending upon the format that is being used.

Different objects background colors (arbitrary) selected for better identification of different objects sharing the same band of visible light color or IR band signatures. This is when no identification of objects (within a pixel) is made for the considered objects.

Different objects (arbitrary) substitute colors or actual color detected in the visible light or IR. This is for better identification of different objects sharing the same band of visible light color or IR band signatures. This is when an identification of objects (within a pixel) is made for the considered objects.

Set up "n" designating the number of prime colors or channels within a pixel for visible light or IR channels. The channels for visible light (CCD Pixel) include, Red, Green, Blue and gray reference.

Set up the number of colors in the color spectrum that belong to the same target channels within visible or IR.

Set up the number of targets sharing the same spectrum of prime colors within visible light or IR channels. Objects may share some of the wavelengths in electromagnetic spectrum, but not all.

Set up lower and upper limits of intensities of each prime color or channel within a band of IR for a band pass filter. This set up might include low pass or high pass parameter for a low pass or high pass filter.

Set up a maximum number of pixels wherein no color of an object is detected in a row or a column to signify a gap between two objects.

Set up a minimum number of undetected colors of a target in the same frame coordinates for "f" number of frames, to signify the missing pixels are due to undetected color variations within targets.

Set up a minimum undetected pixels

Set up new output frame for each one of the targets to display detected or undetected pixel (for human visual observance). Each detected pixel will display either the actual or a substitute color for visible light and IR.

Specify and set up different objects expected to be detected in different channels or prime colors of electromagnetic field.

Define the "x" (row) by "y" (column) frame coordinates

Software Detection

An apparatus and process for performing digital filtering and identification of objects in electromagnetic waves from a source in a sequence of raster input pixel signals, each respective raster input pixel having, an ordered n-tuple (channel) set of values from a camera or sensors signify n-tuple wavelength (channel) identification pixel of channels of electromagnetic waves band, wherein a band of electromagnetic waves are any band within the electromagnetic wave length (such as MWIR) and a channel (channel) is referred to n number of smaller bands within the designated band, hereafter refereed channel.

Referring now to software Filtering and target identification, FIG. 10, the process begins with (1) providing a bandwidth of the prime colors of a target for recognition of a color belonging to a target within a frame, (2) storing the detected colors of different targets in a frame file (in the relevant x, and y coordinate) including the color number. Referring now to the block diagram of FIG. 10, we find the following steps to detect targets either in visible light or IR as following (for convince the flow chart of FIG. 10 discusses visible light, the same applies for IR if the word prime color is substituted with channel):

a) Wait for the frame start initialization signal from frame synchronization logic.

b) Upon reception of the start of the frame signal (block 25), read the intensity of one of the prime colors (30) such as red, green, or blue (or different channels of IR established during initialization) that appear in the video digital bit stream and proceed to block 40;

c) At block 40, check if the intensities of three prime colors falls within the selected limits; if it does transition to next block 45, otherwise transition to block 50;

d) at block 45 keep the object number, color number, pixel coordinates and increment "n" and transitions to block 55;

e) at block 50 store the substituting prime colors (of a pixel) for this object in relevant coordinates as a background for visible light;

f) At block 55, check for the end of prime colors (or channels), if it is not the end, transition back to block 30, otherwise transition to block 65;

g) At block 65, store color number and its associate targets in the same pixel coordinates in a frame; store the same color number of a substitute color in the same coordinates; increment coordinate and transition to block 75;

h) at block 75, check for the end of pixels in a row and column of a frame, if it is not the end of all pixels in a frame and transition to block 30, otherwise transition to next stage of concurrent processing;

Referring now to FIG. 11 that follows the processing from previous section, to add all colors detected in the same pixel coordinates in "f" number of frame. It provides a single file similar to a regular file coordinates to represent "f" number of files in which detected colors in the same pixel coordinates of the single files are added, the process includes the following steps:

a) Set x, and y coordinates to zero and set "f"=1.

b) At block 110, read the object's number and number of colors associated with that object and increment coordinate number.

c) At decision block 115, check the number of colors detected during c) is larger or equal to the value "r", if it is transition to block 120, otherwise transition to block 125.

d) At block 120 add the detected number of colors of the pixel and the object number to the new single frame, and transition back to block 110;

e) At block 125 look for the end of x, and y coordinates, if it not the end of one frame coordinates transition to bloc 110, otherwise transition to block 130.

f) At block 130 look for the next object supposed to have been detected in step c) and transition to block 135.

g) At block 135, check for the end of the objects set during initialization to be detected, if more objects go to block 100, otherwise transition to block 140.

h) At block 140, increment the frame number part of consecutive number of frames set during initialization, then transition to block 145.

i) At block 145, check for the end of frames, if it is not the end transition to block 100, otherwise exit.

Referring now to FIG. 12 another single multi frame file with coordinates similar to a single file, is generated to sort and store different colors detection of different targets, specified in the previous paragraph are stored with the addition that if the number of colors detected for each color entry is less than a number "a" it is discarded as follows:

a) At block 200, initialize the multi frame "f" coordinates.

b) At block 205, initialize the possible color entries of a coordinate.

c) At block 210 read the next number of color of the of the color entries.

d) At block 220 check if the number of the color entries is less than a value "b" if it is less, discard the color entry and go back to block 210, otherwise go to block 225.

e) At block 225, increment the color entry and transition to block 235.

f) At block 235, check for the end of possible entries, if it is not go back to block 210, if it is go to block 240.

g) At block 240 increment the coordinate number and go to block 245.

h) At block 245 check for the end of coordinates, if it is not go back to 205, otherwise end this process.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for performing digital video calibration of electromagnetic waves for system impurity calibration; a sequence of raster input pixel signals, each respective raster input pixel having, an n-tuple set of values of electromagnetic waves from a video camera or sensors to signify n-tuple intensity identification relating to a pixel, the n-tuple (hereafter called channels) set, that is selected from adjacent or separate bands or sub-bands representing a channel of electromagnetic wave; wherein data intensities constituting a set of addresses input to plurality of "n" memories; each memory address pre-loaded with a set of data to represent scaling, calibration, and/or correction, for correcting system caused imperfections, including and not limited to variations in FPA temperature, optical imperfections and or individual pixel impurities affecting sensor data; correction made by altering the received sensor data with a pre-recorded or empirically derived data; corrections to be made with a cascading memories in which each stage of the memory in the cascading (series) of stages, correcting data due to a different sources of the imperfection shown in FIGS. 2, 2B, and 2C as follows:
   a) a controller for sequencing activity of each stage and to direct the output from any previous stage to the next stage;
      radiometric pixel by pixel corrections for the imperfections of equipment are corrected by setting the CCD frame address such as rows and columns to plurality of Radiometric Correction Memory address generator, wherein the data contents are set to address to the Radiometric Data Correction (substitution), in which the data correction for each pixel is already preloaded; Memory identify each pixel and data corrections:
   b) inhibit (prevent) corrections along any one of the cascading stages;
   c) the sequence timing to be done with a fastest system clock synchronized to pixel timing or sequencing without timing in which the final (data) settlement of each stage and all the stages, is valid upon electronic propagation settlement of stages;
   d) controller having individual control lines for each stage to transfer data from any previous stage to this stage;
   e) initial stages are allocated to the system imperfections affecting all pixels, and secondary stages will be pixel location related;
   f) each stage consisting of a correction memory in which data contents is the correction a pixel sensor and the address to the memory is sensor data, previous stage sensor data, quantized source of imperfection for each stage or pixel coordinates;
      each correcting memories data preloaded with a set of data to replace the affected sensor data according to FIGS. 2, 2B and 2C;
   g) each stage is armed with correct no correct signal from the controller with additional signal to enable or disable outputs from registers or memories;
   h) controller initially receiving control information from the main CPU or dynamically receiving changes based upon the health of the system.

2. The apparatus of claim 1 further providing calibrations caused by adverse environmental condition; a group of Calibration Memories each having a relevant Calibration Function Generator receiving calibration sensor (data) in any spectral electromagnetic range to have a known emissions or abortions close to the target, for gas or solid substance; each calibration memory comparing the received calibration data with a known calibration data; each Calibration Function Generator providing a calibration factor in which regular channels are calibrated accordingly as follows:
   calibrations due to presence of different gaseous elements or solid substances primarily in the atmosphere, for altering regular channels having the target intensity in different spectral field;
   a) detecting the highest or lowest energy densities of an environmental element (such as cloud, fog, CO2, rain, or sand storms), and to provide calibration corrections information for different channels of different elements;
   b) Calibration Factors are amended to the regular data channels and set as an address to Calibrating Memories to adjust the received regular channel data, as depicted in FIG. 3B;
      Calibration Factors are derived empirically or other calculation means for any different calculation equation linear exponential, and others;
      Calibration Factors are the most significant bits and calibration data least significant bit;
   c) Calibration Memories are preloaded with the data in which upon addressing of Calibration Factor and channel intensity, it provides the calibrated data FIG. 3B;
   d) regular channels are calibrated for variety of atmospheric substances illumination, brightness, target temperature, rain, fog and distances;
   e) a set of visible light filters, detectors and visible light Calibration Memories for detecting specific color energy densities of an element in the field of view to provide visible light calibration characterization for any one of the Calibration memories elements of cloud, fog, CO2, rain, or sand storms;
   f) gray code (scale) in visible light field is used for illumination and brightness.

3. The apparatus of claim 1 for performing digital video target detection of a sequence of raster input pixel signals, each respective raster input pixel having, an ordered n-tuple set of values from a video camera or sensors to signify n-tuple sub-bands (channels) of IR electromagnetic wavelengths, the apparatus consisting of the following:

a) a digital video synchronization and timing that synchronizes to the header of the incoming digital video data bit stream and provides digital timing and control signal required to identify each one of the "n" tuple set of prime colors, and position of each prime color within a pixel timing;

b) digital filter memories, coupled to receive the intensities of the n-topple sequence of raster input sub-band signal intensities and map each respective n-topple intensity into a respective sub-band memory address each memory address having:

a predetermined memory address range, a sub-band identity number of, a group of sub bands spectra and prime colors belonging to an object within as;

a multi sub-band object's group identity number;

identification of a sub-band of an object within a group of sub-bands belonging to an object, and within different groups of sub-bands;

preloaded with a single bit markers at predetermined addresses;

single bit markers addresses representing a band pass, low pass or high pass filters to be addressed by intensities intended to be detected as a band of filters ("0" not detect, and "1" for detect);

c) sub-band identification marks are input to an n-input AND gate to represent simultaneous detection of all the sub-bands within a pixel timing to declare detections of targets in diffident spectra.

4. The apparatus of claim 1 further providing statistical accumulations of detected pixels of each channel in a multi frame memory in which each channel is dedicated to one of the bits within memory data bit patterns to represent total number of detections of that channel within an arbitrary "f" number of frames and each memory address corresponds to the pixel coordinates in a frame as follows:

a) a set of registers, initialized by a frame header synchronization logic, that is maintained to represent the row and column coordinates of pixel address within a frame of video data that is used to address memories;

b) a set of dual registers A, and B to hold channels detect no detect signals from one pixel timing to the next, to be written into a memory;

c) a set of dual memory frames of A, and B representing the statistical detection occurrences of detected intensities of pixels in one frame;

d) a set of dual memory frames of A, and B representing the statistical detection occurrences of detected intensities of pixels in "f" number of frames;

e) a set of timing generators signifying different timing within a pixel data bit stream period to provide necessary timing to read the contents (partial) of the memory increment the data and write the incremented data back to the memory for "f" number of frames;

f) a set of FIFO's to write the detect no detect of a multiform accumulations of each channel along with the pixel addresses for further processing.

5. The apparatus of claims 1, further providing statistical detection of targets stored in a frame memory addressed by a frame coordinate; each address pointing to a memory location in which each data bit in the memory data bit pattern is assigned to a specific target as follows:

a) a memory addressed by the detect no detect data bits (claim 4) and preloaded with data associating expected targets to be detected in plurality of channels, each target being assigned to a specific data bit in the memory data bit pattern on pixel by pixel level basis;

b) a set of dual memory frames of A, and B representing the statistical detection of intensities of targets in one frame;

c) a set of dual memory frames of A, and B representing the statistical detection of detected intensities of targets in "f" number of frames;

d) a set of timing generators signifying different timing within a pixel data bit stream period to provide necessary timing to read the contents (partial) of the memory increment the data and write the incremented data back to the memory for "f" number of frames;

e) a set of FIFO's to write the detect no detect of targets in a multiform accumulations along with the frame coordinated in which a target was detected.

6. The apparatus of claim 1 wherein concentration of individual gases within CWAs, mustards and TNT are measured in the relevant electromagnetic spectra (such as 9 to 13.5 um, and visible light spectra) using plurality of tunable filter memories as follows;

a) digital filter tunable memories, coupled to receive the intensities of the n-topple sequence of raster input sub-band signal intensities and map each respective n-topple intensity into a respective sub-band memory address each memory address having: a predetermined memory address range, a group of sub bands spectra belonging to certain gas within as;

a multi sub-band object's group identity number;

identification of a sub-band of a gaseous element within a group of sub-bands belonging to a compound;

memories preloaded with a single bit markers at predetermined addresses;

single bit markers addresses representing a band pass, low pass or high pass filters to be addressed by intensities intended for detection within a sub band of filters ("0" not detect, and "1" for detect);

sub-band identification marks are input to an n-input AND gate to represent simultaneous detection of all the sub-bands within a pixel timing to declare detections of targets in diffident spectra;

b) a controller having interfaces to the tunable memories;

read the one bit detect no detect signal;

read the relevant intensities from the intensity registers, and compare received intensities with expected intensities;

adjust the band pass filtering of the memories, rearranging "1's" and "O's"

having the pre stored absorbance coefficients at certain wavelength, for a specific substance (species) for measurements of concentrations;

having necessary capability to adjust the absorption confident for each substance and to provide calculations for measurements of concentrations of substances;

having necessary capability to provide algorithms and calculations to measure individual concentrations of compounds.

7. The apparatus of claim 1 for remote concentration measurement of individual gases within a group of CWAs, mustards and TNT within electromagnetic spectra (such as 9 to 13.5 um, and visible light); by further dividing the spectral band to much smaller sub-bands, each sub-band having its own absorption coefficients belonging to one of the target element within the group of elements; using plurality of filters, sensors, dispersing elements, CCDs, amplifiers to subdivide the spectrum into sub-bands; sub-bands spaced to achieve concentration measurements of compounds within the band; a controller having calculating capability and absorption coefficients of each target compound for measurements of harmful chemicals even in the presence of other gases as follows:
- a) a plurality of optical filters placed along the path of the electromagnetic signals;
  each filter dividing the said band into groups of smaller bands;
- b) a plurality of dispersing elements placed along the path of each group of smaller band spectra to further subdivide the small groups into smaller sub-bands;
- c) a plurality of CCD substrates placed along the path of sub-bands to absorb photon energy and convert it to electricity;
- d) a plurality of analog amplifiers; each to amplify the voltages generated by CCD charges of each sub-band;
- e) a plurality of multiplexers guiding and distributing sub-band analog voltages into the inputs of A/D converters that quantizes amplifier analog voltages to digital bit streams;
- f) the CPU having absorption coefficient for each channel, and calculation processing capability to measure individual concentrations of each compound within the group of compounds.

8. The apparatus of claim 7 wherein each detected target (solid, liquid or gas within a pixel) is represented into a visible light video frame format, for each substance to represent by a pre-assigned color as follows:
- a) along with the mark "1" bit, in the tunable filter memories, a set of data representing a color for each substance, each set of data consisting of three prime colors selected for a detected target; for the combination of prime colors to be displayed on a monitor to represent a pixel for the choice color, to be viewed by an operator.

9. An apparatus to generate memory address to a large memory system and memory banks in which the source of address generation is plurality of "n" registers, each register is set to different variable values of n(1), n(2), n(3), to n(x), wherein (x) denotes the length of each register, the apparatus consisting of the following:
- a) plurality of "n" registers, each register receiving its data from different sources, of sensors or CPU;
- b) a memory based address lookup table block, coupled to the registers, to translate variable data into a fixed memory address;
  the memory based address lookup table block, consisting of either a PROM or a Random Access Memory, wherein the contents of the RAM is set by a register or CPU, to address the address lookup table block to generate address to the memory bank, and / or memory;
  the address lookup table provides a translation from all the various levels of strength (quotient), to an absolute memory bank address value, within a memory bank;
  an address lookup table provides a translation from a set of pre-assigned variable levels of strength and direct inputs from the computer address latch, to an absolute memory bank address value, for selecting a memory bank;
- c) a set of memory banks addressed by the selected registers or memory address lookup table; each bank consisting of a sub-bank memory selector, Data Memory Selector and instruction memories;
  instruction memories preloaded with application instruction relevant to the register settings and feedback instruction registers;
  Instructions fed to the CPU through a FIFO to execute specific instructions related to register settings; each instruction containing executable instructions, a feedback (to the registers) data, and a number relating to the instruction bytes to be followed;
- d) A CPU receiving information specified in the above through a FIFO for necessary executions with an option to load feedback instruction either before or after the execution of instructions.
- e) a feedback generator.

10. A method of performing digital filtering for performing identification of targets in software in electromagnetic waves received from a video camera in IR and visible light in a sequence of raster input pixel signals, each having, an ordered n-tuple (channel) set of values from a camera or sensors representing n-tuple wavelength (primary colors or channels) identifying bands of electromagnetic waves, wherein a band of electromagnetic waves is any band within so called MWIR (or other similar name bands); filtering begins with (1) initializing an intensity range of the primary colors in visible light or channel intensity in IR of a target for recognition within certain band of frequencies; (2) storing the detected colors or channels of targets in a frame file (in the relevant x, and y coordinate) including the color number. (3) recognition of the colors belonging to the same target within same pixel as follows: (for convenience the flow chart of FIG. 10 discusses visible light, in which the same applies for IR and the word "prime color" is substituted with the word channel):
- a) wait for the frame start initialization signal from frame synchronization logic and go to the next step;
- b) initialize "n"
- c) read the intensity of one of the prime colors such as red, green, or blue (or different channels of IR established during initialization) that appear in the video digital bit stream and proceed to the next step;
- d) check if the intensities of three prime colors falls within the selected limits; if it does transition to next step, otherwise transition to step e);
- e) keep the target number, color number, pixel coordinates and increment "n";
- f) store the substituting prime colors (of a pixel) for this object in relevant coordinates as a background for visible light;
- g) check for the end of prime colors (or channels), if it is not the end, transition back to block step c), otherwise transition to next step;
- h) store color number and its associate targets in the same pixel coordinates in a frame; store the same color number of a substitute color in the same coordinates; increment coordinate and transition to next step;
- i) check for the end of pixels in a row and column of a frame, if it is not the end of all pixels in a flame and transition to step b), otherwise transition to next stage of concurrent processing.

11. The method of claim 10 to provide a single file to identify objects based upon associated color identification performed in "f" in a number of frames, per following steps (for clarity, FIG. 11 is used):
- j) set x, and y coordinates to zero and select;
- k) at block 110, read the object's number and number of colors associated with that object and increment coordinate number;
- l) at decision block 115, check the number of colors detected during l) is larger or equal to the value "r", if it is transition to block 120, otherwise transition to block 125;
- m) At block 120 add the detected number of colors of the pixel and the object number to the new single frame, and transition back to block 110, n) at block 125 look for the end of x, and y coordinates, if it not the end of one frame coordinates transition to bloc 110, otherwise transition to block 130;

o) at block 130 look for the next object supposed to have been detected in step l) and transition to block 135;

p) at block 135, check for the end of the objects set during initialization to be detected, if more objects go to block 100, otherwise transition to block 140;

q) at block 140, increment the frame number part of consecutive number of frames set during initialization, then transition to block 145;

r) at block 145, check for the end of frames, if it is not the end transition to block 100, otherwise exit.

12. The method of claim 11 wherein a single multi frame file with coordinates of a single file is generated to store colors with their associate targets in a single multi flame "f", storing relating colors (Channels) to different targets, with the addition that if the number of colors detected for each color entry is less than a number "a" it is discarded as follows:

s) initialize the multi frame "f" coordinates;

t) initialize the possible color entries of a coordinate;

u) read the next number of color of the of the color entries;

v) check if the number of the color entries is less than a value "b" if it is less, discard the color entry and go back to u), otherwise go to w);

w) increment the color entry and transition to x);

x) check for the end of possible entries, if it is not go back to u, if it is go to y);

y) increment the coordinate number and go to block z);

z) check for the end of coordinates, if it is not go back to t), otherwise end this process.

\* \* \* \* \*